(12) United States Patent
Islam et al.

(10) Patent No.: US 11,284,477 B2
(45) Date of Patent: Mar. 22, 2022

(54) DOWNLINK CONTROL CHANNEL SIGNALING FOR IMPROVING UE POWER CONSUMPTION

(71) Applicant: Apple Inc., Cupertino, CA (US)

(72) Inventors: Toufiqul Islam, Santa Clara, CA (US); Hong He, Beijing (CN); Qiaoyang Ye, San Jose, CA (US); Honglei Miao, Munich (DE); Gang Xiong, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 56 days.

(21) Appl. No.: 16/520,522

(22) Filed: Jul. 24, 2019

(65) Prior Publication Data

US 2020/0037396 A1 Jan. 30, 2020

Related U.S. Application Data

(60) Provisional application No. 62/703,315, filed on Jul. 25, 2018, provisional application No. 62/702,822, filed on Jul. 24, 2018.

(51) Int. Cl.
| | |
|---|---|
| *H04W 88/06* | (2009.01) |
| *H04W 88/10* | (2009.01) |
| *H04W 76/28* | (2018.01) |
| *H04W 76/27* | (2018.01) |
| *H04W 76/11* | (2018.01) |
| *H04W 52/02* | (2009.01) |
| *H04W 24/08* | (2009.01) |
| *H04W 80/02* | (2009.01) |
| *H04W 72/04* | (2009.01) |

(52) U.S. Cl.
CPC .......... *H04W 88/06* (2013.01); *H04W 24/08* (2013.01); *H04W 52/0229* (2013.01); *H04W 72/042* (2013.01); *H04W 76/11* (2018.02); *H04W 76/27* (2018.02); *H04W 76/28* (2018.02); *H04W 80/02* (2013.01); *H04W 88/10* (2013.01)

(58) Field of Classification Search
CPC ..... H04W 88/06; H04W 88/10; H04W 76/28; H04W 76/11; H04W 76/27; H04W 24/08; H04W 52/0229; H04W 72/042; H04W 80/02
USPC ......................................................... 370/329
See application file for complete search history.

(56) References Cited

U.S. PATENT DOCUMENTS

| | | | |
|---|---|---|---|
| 9,872,252 B1* | 1/2018 | Ang | H04W 76/28 |
| 2013/0215853 A1* | 8/2013 | Li | H04L 5/0094 |
| | | | 370/329 |
| 2018/0279274 A1* | 9/2018 | Sun | H04L 1/1864 |
| 2018/0332655 A1* | 11/2018 | Ang | H04W 52/0216 |
| 2020/0275296 A1* | 8/2020 | Chen | H04W 76/28 |
| 2020/0337038 A1* | 10/2020 | Takeda | H04L 5/0048 |

* cited by examiner

*Primary Examiner* — Chi Tang P Cheng
(74) *Attorney, Agent, or Firm* — Kowert, Hood, Munyon, Rankin & Goetzel, P.C.

(57) ABSTRACT

Described herein are methods and apparatus for implementing discontinuous reception (DRX) states in user equipments (UE) in order to conserve battery power. In particular, methods and apparatus for signaling the UE to transition between different DRX states using L1 signaling such as over the physical downlink control channel (PDCCH) are described.

20 Claims, 8 Drawing Sheets

DOWNLINK CONTROL CHANNEL SIGNALING FOR IMPROVING UE POWER CONSUMPTION

PRIORITY CLAIM

This application claims priority to U.S. Provisional Patent Application Ser. No. 62/703,315, filed Jul. 25, 2018 and U.S. Provisional Patent Application Ser. No. 62/702,822, filed Jul. 24, 2018, both of which are incorporated herein by reference in their entirety.

TECHNICAL FIELD

Embodiments described herein relate generally to wireless networks and communications systems. Some embodiments relate to cellular communication networks including 3GPP (Third Generation Partnership Project) networks, 3GPP LTE (Long Term Evolution) networks, 3GPP LTE-A (LTE Advanced), and 3GPP fifth generation (5G) or new radio (NR) networks, although the scope of the embodiments is not limited in this respect.

BACKGROUND

In Long Term Evolution (LTE) and next generation new radio (NR) systems, a mobile terminal (referred to as a User Equipment or UE) connects to the cellular network via a base station (referred to as an evolved Node B or eNB or as a next generation Node B or gNB). The present disclosure relates to methods and apparatus for implementing discontinuous reception (DRX) states in the UE in order to conserve battery power.

DETAILED DESCRIPTION

Figure 1:
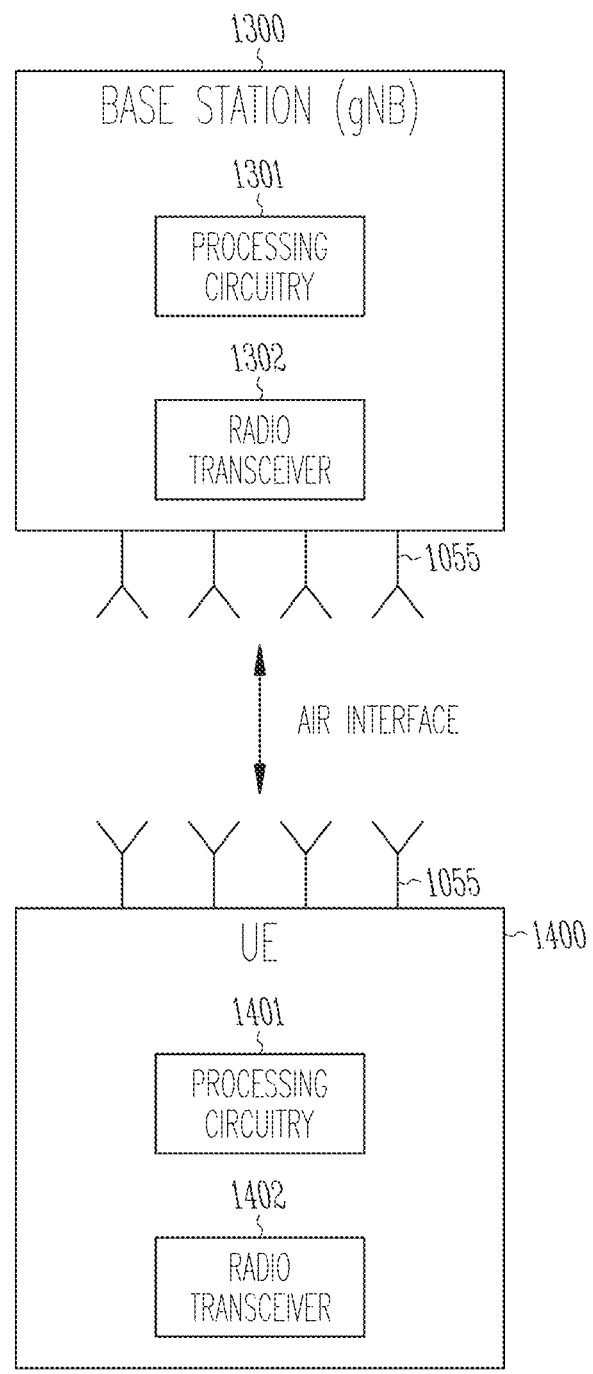
FIG. 1 illustrates an example UE and a base station (BS) such as an eNB or gNB according to some embodiments.

Energy efficiency is of paramount importance for operation of 5G/NR UEs, which may have a diverse range of supported applications compared to LTE devices. In particular, energy consumption should be low when no data is expected/received by the UE. Traffic pattern in many 5G use cases can be bursty and served in short durations. Dynamic UE transition between active state and sleep state may facilitate improved UE power consumption. In particular, control channel monitoring in RRC_connected mode that does not result in any data transmission contributes to a significant portion of UE power consumption. Hence, some network assistance mechanisms can be used to reduce unwanted PDCCH monitoring and trigger the UE to sleep whenever possible. Furthermore, in NR, control channel monitoring, operation bandwidth, and many other transmission parameters are UE specifically configured. Hence, it is important to explore UE specific signaling mechanisms that address individual UE requirements and configuration. This disclosure focuses on different UE specific control channel signaling mechanisms to improve UE power consumption.

In LTE and NR C-DRX a connected mode DRX (C-DRX) operation was adopted where DRX parameters are configured by higher layer, such as RRC signaling. However, higher layer signaling to (re)-configure DRX parameters and/or activate DRX mode may not be able to cater for diverse traffic types, arrival patterns in NR, in particular, if the traffic is bursty and appears in short intervals. Embodiments herein provide several UE specific downlink control channel signaling mechanisms to adapt DRX configuration parameters and/or trigger go-to-sleep or wake-up behavior of UE. UE specific DCI signaling may allow for dynamic management of switching between active state and sleep state. The embodiments discussed herein may reduce overall UE power consumption.

For the purposes of the present document, the following terminology may apply to the examples and embodiments discussed herein.

| | |
|---|---|
| ON state, Active state, Network Access Mode | UE is in the state where it can receive signaling/transmission from the network. In particular, during this state UE expects to receive scheduling DCIs. |
| OFF state, Sleep state, | UE is in the state where it does not receive any signaling/transmission from the network. In particular, in |

-continued

| | |
|---|---|
| Power Saving Mode | this state UE does not receive scheduling DCIs. |
| DRX mode | UE is operating with a cycle that comprises a duration of active state and a duration of sleep state |
| Wake Up Signal | UE receives a signaling from network after it was in a sleep/OFF state, the signal if detected properly, triggers the UE to turn ON or be active for a given subsequent duration to monitor for DCIs e.g., PDCCHs and/or other transmissions/signaling from the network. Following detection of WUS, UE may turn ON after a period or immediately. The UE may be triggered to wake up or monitor DCIs/PDCCH subsequent to detection of WUS for a duration that is part of a DRX cycle or for a duration that is not part of a DRX cycle and/or can be larger or smaller than a DRX cycle. |
| Go To Sleep Signal | UE receives a signaling from network while it is in ON/active state, the signal if detected properly, triggers the UE to turn OFF or go to sleep for a given subsequent duration. Following detection of GTS, UE may turn OFF after a period or immediately. The UE may be triggered to go to sleep subsequent to detection of GTS signal for a duration that is part of a DRX cycle or for a duration that is not part of a DRX cycle and/or can be larger or smaller than a DRX cycle. |
| C-DRX, CDRX | UE is operating in a DRX mode in RRC-connected state |

In Long Term Evolution (LTE) and 5G systems, a mobile terminal (referred to as a User Equipment or UE) connects to the cellular network via a base station (BS), referred to as an evolved Node B or eNB in LTE systems and as a next generation evolved Node B or gNB in 5G or NR systems. FIG. 1 illustrates an example of the components of a UE 1400 and a base station (e.g., eNB or gNB) 1300. The BS 1300 includes processing circuitry 1301 connected to a radio transceiver 1302 for providing an air interface. The UE 1400 includes processing circuitry 1401 connected to a radio transceiver 1402 for providing an air interface over the wireless medium. Each of the transceivers in the devices is connected to antennas 1055. The antennas 1055 of the devices form antenna arrays whose directionality may be controlled by the processing circuitry. The memory and processing circuitries of the UE and/or BS may be configured to perform the functions and implement the schemes of the various embodiments described herein.

Overview

Some factors contributing to UE power consumption in connected mode include:
- PDCCH monitoring: Many times UE monitors for PDCCH at the configured PDCCH occasions which do not result in grant assigned.
- Operating BWP size.
- Number of UE Rx/Tx #antennas and active RF chains.
- Measurement operations.

Existing solutions include higher layer configured C-DRX mode where DRX configuration include following RRC configured parameters as shown in Table 1.

TABLE 1

A DRX configuration parameters drx-onDurationTimer: the duration at the beginning of a DRX Cycle, this is when UE monitors for at least PDCCHs;
drx-SlotOffset: the delay before starting the drx-onDurationTimer;
drx-StartOffset: the subframe where the DRX Cycle starts;
drx-InactivityTimer: the duration after the PDCCH occasion in which a PDCCH indicates a new UL or DL transmission for the MAC entity;
drx-RetransmissionTimerDL (per DL HARQ process): the maximum duration until a DL retransmission is received;

TABLE 1-continued

A DRX configuration parameters drx-RetransmissionTimerUL (per UL HARQ process): the maximum duration until a grant for UL retransmission is received;
drx-LongCycle: the Long DRX cycle;
drx-ShortCycle (optional): the Short DRX cycle;
drx-ShortCycleTimer (optional): the duration the UE shall follow the Short DRX cycle;
drx-HARQ-RTT-TimerDL (per DL HARQ process): the minimum duration before a DL assignment for HARQ retransmission is expected by the MAC entity;
drx-HARQ-RTT-TimerUL (per UL HARQ process): the minimum duration before a UL HARQ retransmission grant is expected by the MAC entity.

In NR, a UE may support diverse traffic types and, in some situations, data can be quite bursty, and delivered over a short duration. One set of pre-configured RRC parameters of DRX operation may not adapt well to diverse traffic pattern and dynamic bursty nature of traffic. Hence, it may be beneficial that one or more of the following mechanisms are adopted to cater for current requirement of a UE and dynamic traffic arrival pattern.

Multiple DRX Configurations are Provided to a UE

Based on nature of active traffic flow to/from a UE, one DRX configuration form set of supported DRX configurations can be active at a given time. One DRX configuration comprises at least the set of parameters indicated in the above list in Table 1. A first DRX configuration is different from a second DRX configuration if at least one parameter is different. Table 2 shows an example that K configurations can be supported for a UE, of which an index referring to one of the configuration can be indicated. Each configuration has one or more parameters from Table 1 and possibly more parameters, such as wake-up signal monitoring duration, offset to start location of wake-up signal monitoring duration, offset to start location of ON duration for control channel e.g., monitoring after wake-up signal is detected etc. Here, one or more of additional parameters, if configured as part of DRX configuration, may correspond to configurations related to wake-up signal monitoring.

TABLE 2

Multiple configurations

| DRX-Config Index | Configuration content |
|---|---|
| 0 | Parameter 1, Parameter 2, etc. |
| 1 | . . . |
| . . . | . . . |
| K | . . . |

A MAC CE can be added to activate one of several configured DRX-Configs to be used for the MAC entity of the respective cell group. This would enable UE to dynamically adjust multiple DRX parameters through a single MAC command instead of semi-static RRC reconfiguration message. The number of supported DRX-Configs per MAC entity, e.g, K in the above table can be a UE capability parameter.

Furthermore, in NR, a UE may be able to communicate with multiple numerologies, either in different bandwidth parts or carriers, where UE may or may not be able to simultaneously transmit/receive with different numerologies. Transmission with different numerologies require separate FFTs and possibly different RF chains, and hence, it may be beneficial, to configure numerology-specific or bandwidth part specific or carrier-specific one or more DRX configurations.

In an embodiment, currently different numerologies can be configured for different BWPs, and BWP switching can be performed by either explicit DCI command or background timer operation. e.g., bwp-inactivityTimer. If different DRX configurations are desired for different BWPs with various numerologies, it can be beneficial that the DRX configuration can be switched along with the BWP switching. To this end, the DRX configurations in Table 2 can be linked with a particular BWP ID and/or cell ID within the cell group.

DCI Based Signaling for Faster Adaptation of DRX Parameters and/or Transition Between Active and Sleep State.

In contrast to existing solutions where DRX mode is configured by RRC signaling, dynamic L1 signaling such as downlink control information (DCI) e.g., in a PDCCH can be used to notify UE of adaptation of DRX parameters and/or activation/deactivation of DRX mode and/or to go to sleep and/or wake up from sleep. Various examples of DCI based indication mechanisms for adaptive DRX mode management are provided infra.

Different Types of DRX Mode Operation

The types of DRX mode operation that can be configured to a UE in connected mode are as follows:
a. Type 1: Activation and/or de-activation of DRX mode with at least one DRX configuration by RRC or MAC CE.
  i. Type 1a: RRC signaling can be provided to (re)configure one or more DRX parameters/switch DRX configuration.
  ii. Type 1b: L1 signaling can be provided to update DRX parameters/switch DRX configuration and/or indicate go-to-sleep and/or wake-up trigger.
  iii. Type 1c: RRC signaling or a combination of L1 and RRC signaling can be provided to (re)configure one or more DRX parameters/switch DRX configuration and/or L1 signaling can be provided to indicate go-to-sleep and/or wake-up trigger.
  iv. Type 1d: A new MAC CE may be introduced for DRX parameters reconfiguration, which is identified by a MAC PDU subheader with a dedicated LCID (Logical Channel Group ID). In addition, it may have a fixed size and consist a field to indicate the DRX parameter set or configuration index to be applied by MAC entity. In addition, L1 signaling can be provided to indicate go-to-sleep and/or wake-up trigger.
b. Type 2: Activation and/or de-activation of DRX mode with at least one DRX configuration by L1 signaling.
  i. Type 2a: RRC or MAC CE signaling can be provided to reconfigure one or more DRX parameters/switch DRX configuration.
  ii. Type 2b: L1 signaling can be provided to update DRX parameters/switch DRX configuration and/or indicate go-to-sleep and/or wake-up trigger.
  iii. Type 2c: RRC/MAC CE signaling or a combination of L1 and RRC/MAC CE signaling can be provided to (re)configure one or more DRX parameters/switch DRX configuration and/or L1 signaling can be provided to indicate go-to-sleep and/or wake-up trigger.

Note that activation of DRX mode with at least one DRX configuration does not necessarily imply DRX configuration index is always indicated in the L1 signaling that provides activation trigger, rather it may also be possible that UE is configured with at least one DRX configuration by prior higher layer signaling such as RRC signaling and L1 activation signaling just turns ON the DRX mode with the previously indicated DRX configuration.

Examples of L1 signaling include sequence-based or DCI-based transmission, e.g., in a PDCCH or a combination of them, where both can be UE specific or group-common. The unit of one or more of different configured or indicated durations can be expressed in sub-ms and/or ms and/or symbols/slot(s) of a given numerology. Examples of higher layer signaling in the context of following embodiments include NR MSI, NR RMSI, NR OSI, or RRC signaling, where RRC signaling can be UE-specific or group common. Embodiments described herein relate mainly to UE-specific DCI based signaling but may be easily modified to function with group common signaling.

Type 1 DRX Mode Operation

Type 1 DRX mode operation assumes UE receives RRC signaling which activates DRX mode operation with a certain DRX configuration. Note that UE may be indicated one from a multiple of supported DRX configurations. Alternatively, one default index value may be hard-coded in specification among the configured DRX parameters sets (e.g. smaller index) and applied for DRX operation if UE is not provided a DRX configuration by MAC CE or physical layer signaling (sequence-based or DCI-based L1 signaling).

Next, depending on how DRX configuration and/or active/sleep state durations are adjusted, further classification of Type 1 can be obtained. For type 1a, while the UE is operating in the DRX mode, further RRC signaling can be provided to (re)-configure one or more parameters (or switch configuration) such as shown in Table 1. Alternatively, as considered in type 1b, for faster DRX adaptation, L1 signaling can be provided to update DRX parameters or switch configuration. Furthermore, L1 signaling can also be exploited to dynamically modify effective ON and OFF durations by means of go-to-sleep (GTS) and/or wake-up signal (WUS). The L1 signaling that provides GTS or WUS can be same or different than L1 signaling that updates DRX parameters. Unless otherwise mentioned, it is assumed that network sends WUS or GTS signaling only when needed, otherwise network does not transmit anything at the monitoring occasion. In other words, the UE does not expect to receive WUS or GTS signaling in each WUS or GTS monitoring occasion configured by higher layers and corresponding UE behaviors were further disclosed in the following so as to align network and UE DRX related operations (e.g. PDCCH transmission at the gNB and the associated reception at the UE). The embodiments herein are applicable to type 1b, type 1c and type 1d.

GTS Signaling Only

Figure 2:
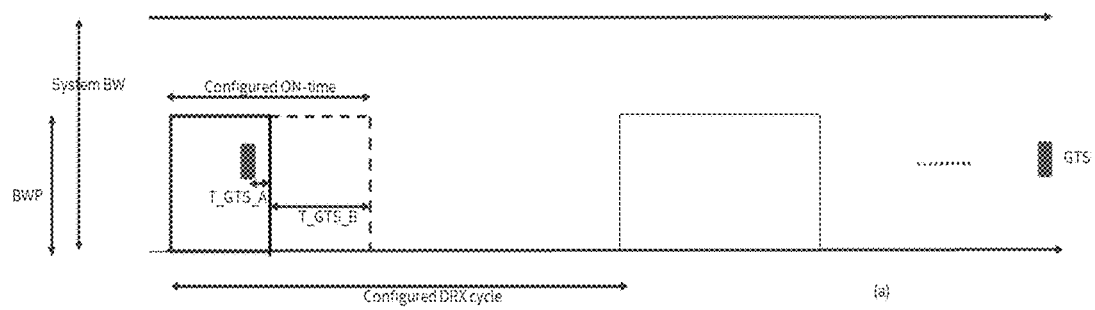
FIG. 2 shows C-DRX mode operation where UE may receive GTS L1 signaling during ON state to put the UE to sleep before ON duration ends.
Figure 3:
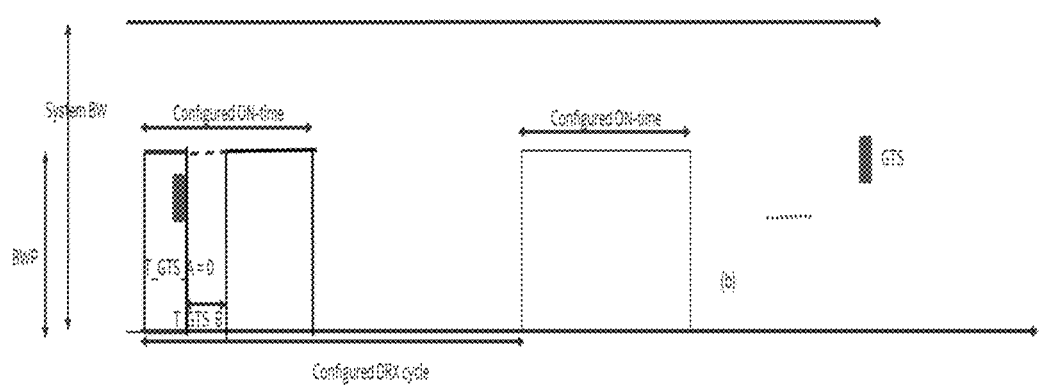
FIG. 3 shows C-DRX mode operation where UE may receive GTS L1 signaling during ON state to put the UE to into a micro-sleep within the configured ON duration.
Figure 4:
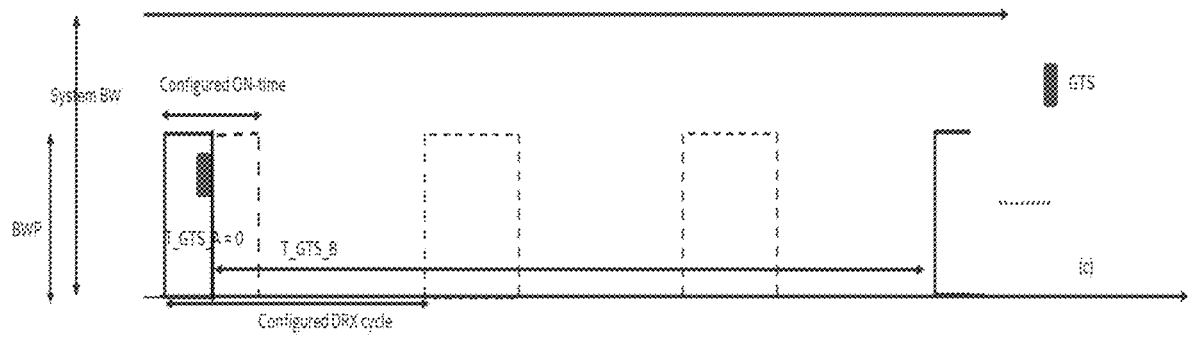
FIG. 4 shows indicated or configured sleep duration when GTS trigger is received may span more than a DRX cycle.

In some embodiments, such as are shown in FIGS. 2-4, the UE is operating with a configured C-DRX mode within a BWP or a carrier, e.g., with a given DRX cycle with certain configured ON duration. UE is configured to monitor a L1 signaling for GTS during the active/ON state of the DRX mode. Depending on how long ON duration is configured, GTS signaling can put the UE to sleep before configured ON duration and/or drx-InactivityTimer ends, cf. FIG. 2 (where GTS signal is received during configured ON duration drx-onDurationTimer), or can trigger a micro-sleep within the ON duration, as shown in FIG. 3. UE may potentially skip PDCCH monitoring for a period/duration following GTS trigger is detected. UE monitors PDCCH during ON duration and is not configured to receive WUS. In this embodiment, L1 signaling for GTS only triggers the UE to go to sleep. UE continues to follow existing DRX configuration where sleep or active state duration can only be modified if GTS trigger is received. Dashed area in FIG. 2 implies skipped ON duration, this also applies to other subsequent figures unless mentioned otherwise.

GTS signaling may also indicate the start position and duration of the sleep duration. Two parameters are identified, T_GTS_A and T_GTS_B, where the former refers to the time before the UE goes to sleep after GTS trigger is received according to FIG. 2, and the latter refers to the indicated sleep duration. In other words. T_GTS_A indicates offset to start position with respect to location where GTS signaling was received (e.g., offset can be counted from the next symbol after GTS was received and until the symbol after which the sleep duration starts) and T_GTS_B indicates sleep duration. The sleep duration here implies UE skips PDCCH monitoring during this duration. In another example, the start position can be indicated as an offset to another reference point, e.g., slot boundary (e.g., from the beginning of the slot during which GTS signaling is received) or sub-frame boundary. In one example, T_GTS_A can more generally represent the indication of start position of the duration. In FIG. 2, an example is shown where T_GTS_A indicates offset with respect to the location of the GTS signaling. In one example, T_GTS_A and/or T_GTS_B can be higher layer configured or indicated as part of the GTS trigger. In one example, T_GTS_A and/or T_GTS_B can be fixed in specifications or a pre-defined mapping can be obtained based on one or more DRX parameters, such as DRX ON duration. Unit of offset to start position of sleep duration, e.g., T_GTS_A and sleep duration, e.g., T_GTS_B can be in symbols or slots, for a given numerology or in ms or sub-ms. FIGS. 2-3 show two examples, where in (a), T_GTS_B is set such that UE is put to sleep for the remainder of the configured ON duration, whereas in (b), T_GTS_B is a rather small value which only triggers a micro-sleep and after the elapsed time, UE wakes up to monitor PDCCH or other signaling for the remainder of the ON duration. T_GTS_A maybe a function of UE capability. In one example, it is also possible that T_GTS_B is set to a value which may be equal to or larger than DRX cycle. In some cases, if network expects a given UE may not receive PDCCH for one or more subsequent DRX cycle or if some latency can be tolerated for transmission, it may indicate a large T_GTS_B so that UE may be put to sleep spanning one or more subsequent DRX cycles, e.g., one or more subsequent ON durations are skipped. This is shown in FIG. 4 wherein UE is signaled to sleep three DRX cycles starting from the DRX cycle where UE receives the GTS DCI format.

For the first embodiment, a UE specific DCI may be used for updating the new DRX parameters where the CRC bits of the DCI may be scrambled by C-RNTI or other dedicated RNTI, which can be configured by higher layers via NR minimum system information (MSI). NR remaining minimum system information (RMSI), NR other system information (OSI) or radio resource control (RRC) signalling. The DCI may have one or more fields to indicate the GTS trigger and/or T_GTS_A and/or T_GTS_B. In one example, GTS trigger may not be needed if UE detects that the DCI format itself is solely for GTS. One or more fields indicating T_GTS_A and/or T_GTS_B may have $K \Rightarrow 1$ bits to indicate the value, e.g., one field can indicate index of a pair of T_GTS_A and T_GTS_B or separate fields can be used for indication, where each field may have one or more bits In one example, one field comprising $K \Rightarrow 1$ bits maybe used to indicate one from a set of supported values for T_GTS_B. In another example, T_GTS_A is not configured or indicated and subject to UE implementation/capability, e.g., how fast a UE can decode L1 trigger and consequently go to sleep. In one example, if the DCI carrying GTS trigger match payload of other DCIs monitored by the UE, a flag can be used to identify the purpose. Moreover, some padding or filler bits maybe used to match the payload of a given DCI format.

In a second embodiment, L1 signaling may trigger GTS along with switching one or more DRX parameters. For example, L1 signaling may switch the UE to a short DRX cycle from a long DRX cycle or vice versa.

UE may assume the configured values of drx-ShortCycle and drx-ShortCycleTimer or L1 signalling may indicate these values explicitly which in this case over-rides the configured values. Rest of the DRX parameters are RRC configured. In one example, the updated DRX parameters or switched DRX configuration may be effective after T_GTS_A expires or duration indicated by T_GTS_B ends or be applied after the end of current DRX cycle or next Nth DRX cycle, $N \Rightarrow 1$.

Figure 5:
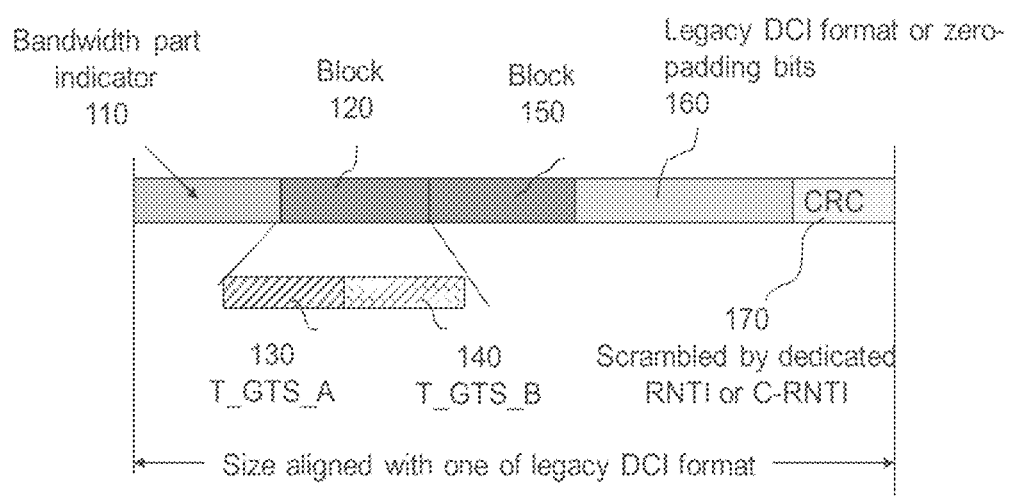
FIG. 5 shows an example DCI format used for fast GTS signalling.

In a third embodiment, the L1 trigger providing GTS may additionally indicate bandwidth part so that the UE wakes up in a different bandwidth part. UE may be in the new bandwidth part for a duration configured by a timer or until further signalling is received to switch. If a timer is configured, then upon expiry UE reverts back to previous or a given default bandwidth part and continue with configured DRX operation. A field comprising $L \Rightarrow 1$ bits may be used in the DCI to indicate one bandwidth part from a set of at most $\log_2 L$ supported bandwidth parts by the UE. In one example, UE may keep operating with a common DRX configuration for all bandwidth parts or when switched to a different bandwidth parts, UE may assume bandwidth part specific DRX configuration, if supported. In one example, the UE may switch to the new BWP after the sleep duration indicated by the GTS signalling or the UE may switch to the new BWP after the end of current DRX cycle or next Nth DRX cycle, $N \Rightarrow 1$ In certain aspects, referring to FIG. 5, exemplified DCI fields to update DRX parameters and/or adapt DRX operations are illustrated in accordance with the previous embodiments. Bandwidth part indicator 110 (indicates BWP ID), where a set of BWPs may be configured by higher layers, is used to indicate the active BWP after wake up for PDCCH monitoring. As discussed earlier in the first embodiment, DCI IE block 120 may comprise of one or two separate fields 130 and 140 to indicate the index of T_GTS_A and/or T_GTS_B values respectively that are configured by higher layers. More generally, block 120 can be used to indicate location of the start position of sleep duration and/or duration of sleep duration. As discussed above, the location of start position can be indicated (e.g., an index is indicated for an offset value from a set of values, where the set of supported offset values can be higher layer configured or listed in specifications) as an offset with respect to a reference point, such as slot boundary, sub-frame boundary or location of where GTS signalling is received. In addition. DCI IE Block 150 may be used to indicate the index of new DRX parameters or configuration, which includes but not limited to be parameters related to the DRX cycle and PDCCH monitoring occasions. If the number of bits in this exemplified DCI format is less than the payload size of one legacy DCI format as defined in NR Rel-15 in the same serving cell, zeros shall be appended until the payload size equals that of legacy DCI format. Block 160 accounts for zero padding to match the payload of a legacy DCI format or some additional fields or some reserved fields to be used for future use. It should be noted that a subset of DCI IEs in FIG. 5 may be present in the GTS DCI format (e.g. BWP ID 110 and T_GTS_B 140 IEs). In another example, the DCI format may have a header or identifier or a flag in a field (not shown in FIG. 5), e.g., if DCI format matches the payload size of a given DCI format. This may be necessary if more than one DCI format with same payload can be received in same CORESET or search space. In one example, the DCI format may have a field containing header or identifier or flag (not shown in FIG. 5), e.g., flag can be used to distinguish if one or more DCI formats with same payload can be detected in same CORESET or search space. In another example, the DCI format providing GTS signalling may have a unique payload size.

Figure 6:
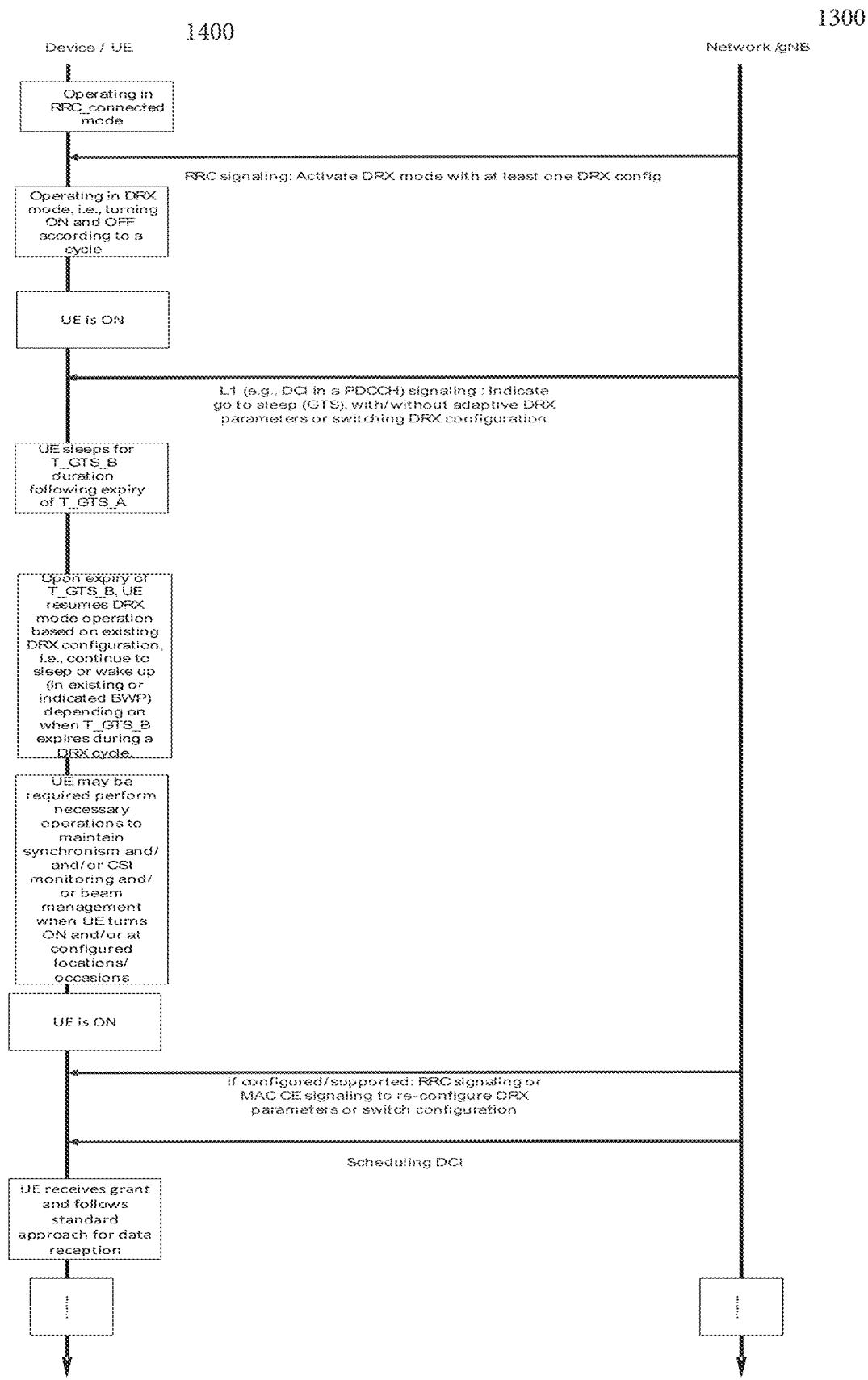
FIG. 6 illustrates an example procedure showing device/UE operation in DRX mode according to type 1b or type 1c or type 1d.

FIG. 6 shows an example procedure for UE operation according to type 1b, 1c, or 1d. The UE 1400 is in RRC_connected mode and communicates with gNB 1300 as shown. First, the UE obtains RRC activation signalling with at least one DRX configuration. The DRX configuration provides one or more of the DRX parameters listed in Table 1 or possibly more parameters. Additional parameters not listed in Table 1 include T_GTS_A and/or T_GTS_B. When the UE is in ON duration and monitoring DCIs/PDCCH, UE can receive L1 signalling such as DCI in a PDCCH for GTS signalling. The GTS signaling may indicate T_GTS_A and/or T_GTS_B and/or indicate switching one or more DRX parameters within the existing DRX configuration or indicate a DRX configuration index and/or indicate a bandwidth part where the UE wakes up in the next ON duration. UE starts to sleep after indicated T_GTS_A for a duration T_GTS_B. After the expiry of T_GTS_B, UE resumes DRX operation according to the existing or indicated DRX configuration. Note that as the UE is in RRC_connected mode, it is assumed that UE keeps synchronism during DRX mode operation and may receive necessary signaling from network to maintain that. Similarly, UE may receive CSI reference signal transmission from network and/or perform other beam management procedures either at the beginning of configured ON duration or just before the configured ON duration (not shown in the figures). When the UE is in ON duration, further RRC signaling or MAC CE signaling can be provided to UE to switch DRX parameters or switch DRX configuration.

WUS Signaling Only

In one example of the DRX mode operation of the UE, UE is acting based on a configured DRX mode, e.g., according to higher layer signaled DRX configuration. However, there can be two ON durations configured, a first ON duration when UE monitors for WUS, which if detected, triggers the UE to be ON for a subsequent duration. The first ON duration implies a period/duration during which UE monitors for WUS, i.e., the first duration comprises the monitoring occasions for WUS.

In a fourth embodiment, UE is configured with a WUS monitoring duration. The UE is only ON for this duration every DRX cycle, unless WUS is detected which would require the UE to wake up and monitor for a configured ON duration for regular PDCCH and other signaling monitoring. This may result in more power saving compared to the case when UE always wakes up for a configured ON duration for PDCCH monitoring which can be much longer than duration of WUS monitoring. Note that WUS monitoring duration may additionally be used for beam management and/or other necessary synchronization operation if needed, which can be performed even before UE monitors WUS.

Figure 7:
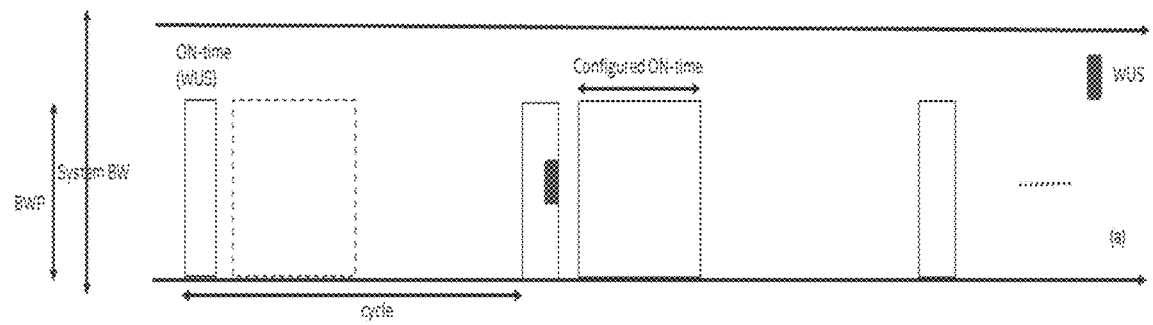
FIG. 7 shows an example where UE turns ON for monitoring WUS for a limited duration according to a configured DRX cycle, and if detected, it wakes up and monitor for a configured –ON duration after a period of time
Figure 8:
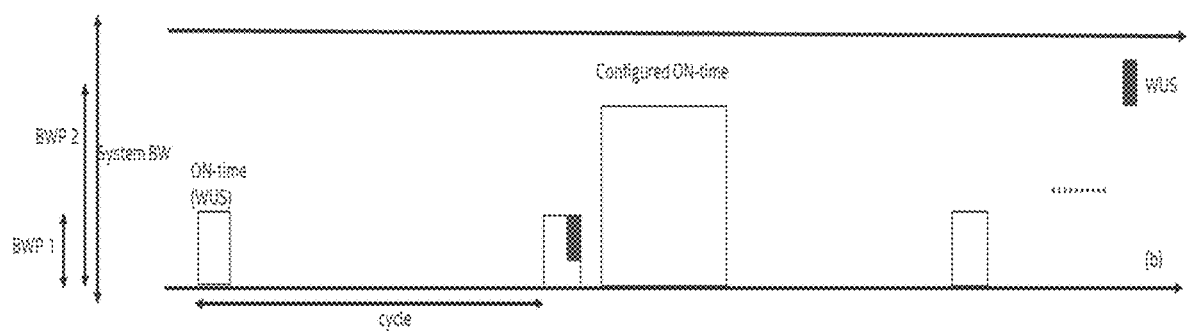
FIG. 8 shows an example where WUS, if detected may trigger the UE to switch BWP for active state operation.
Figure 9:
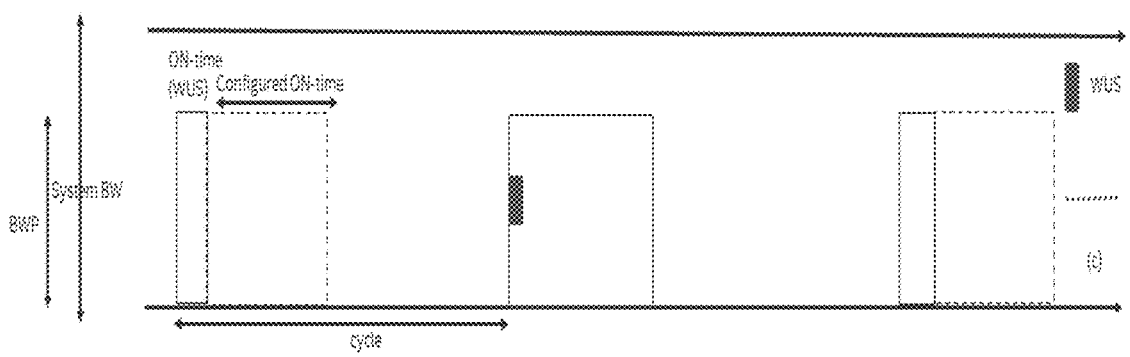
FIG. 9 shows an example where UE immediately starts monitoring for PDCCH and other signaling for the configured ON duration after WUS is detected.

In FIGS. 7-9, UE is operating with a DRX mode with two configured ON times. One being drx-onDurationTimer (e.g., configured ON time in FIGS. 7-9) and another drx-onDurationTimer-WUS (e.g., ON time (WUS) in FIGS. 7-9), where drx-onDurationTimer does not start unless WUS is detected during drx-onDurationTimer-WUS and in one example drx-onDurationTimer-WUS drx-onDurationTimer. DRX configuration may include drx-onDurationTimer-WUS as part of the configuration. Hence, the minimum ON duration every DRX cycle is drx-onDurationTimer-WUS, unlike drx-onDurationTimer which is the minimum ON duration in existing C-DRX mode operation that does not reply on WUS. Here drx-onDurationTimer-WUS comprises the monitoring occasions of WUS.

In FIGS. 7-8, there is a gap between when drx-onDurationTimer-WUS ends and drx-onDurationTimer starts. This implies WUS is monitored at an offset before when drx-onDurationTimer can start. In FIG. 8, it is assumed that WUS may potentially indicate BWP, e.g., UE wakes up and start monitoring for regular BWP in a different, possibly, larger BWP than used for WUS monitoring. In another example, similar to what is shown in FIG. 8, WUS can be monitored in a small BWP (e.g., BWP 1) and if detected, UE may switch to a default/configured bandwidth part (e.g., BWP 2) or the bandwidth part where the UE was previously in before DRX mode was configured. In FIG. 9, it is assumed that drx-onDurationTimer starts immediately after drx-onDurationTimer-WUS ends and WUS is detected. A parameter can be identified Ngap which indicates the inactivity duration which starts after drx-onDurationTimer-WUS expires and ends before drx-onDurationTimer starts. Ngap can be expressed in symbols or slots in a given numerology or in ms, Ngap can be indicated as part of the WUS signaling. In another example, there can be M=>1 monitoring occasions configured within the monitoring window for WUS. In one example, if UE detects WUS early during the monitoring window, UE may sleep for the remaining duration of the monitoring window and turns ON when configured ON duration for PDCCH monitoring starts. In that context, Ngap can be expressed as the time between the location of successful detection of WUS and when ON duration for PDCCH monitoring starts.

In one example, if UE is configured to monitor WUS, the DRX cycle may start with the ON time for WUS monitoring, e.g., drx-onDurationTimer-WUS can be the duration at the beginning of a DRX Cycle instead of drx-onDurationTimer as in existing solutions that do not include WUS. In that context, drx-SlotOffset may indicate the delay before starting the drx-onDurationTimer-WUS, drx-onDurationTimer may start after an offset or immediately upon detection of WUS. Alternatively, in another example, DRX cycle can begin with drx-onDurationTimer as in legacy system and an offset can be configured to identify the location of WUS monitoring window, e.g., UE can be configured to turn ON for the WUS monitoring window, e.g., drx-onDurationTimer-WUS before the configured location where drx-onDurationTimer is supposed to start if WUS is detected where there can be an offset between when drx-onDurationTimer-WUS ends or WUS is detected and drx-onDurationTimer starts.

Figure 10:
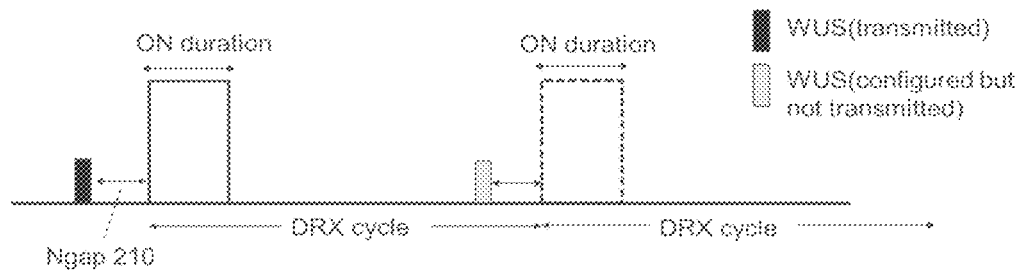
FIG. 10 shows an example WUS configuration for on-off DRX operation.

Note that in examples shown in FIGS. 7-9, DRX cycle is assumed to start from the monitoring window for WUS, i.e., drx-onDurationTimer-WUS. In another embodiment, referencing to FIG. 10, the WUS monitoring window or duration may be $N_{gap}$ symbols or slots for a given numerology or 210 ms before the beginning of a configured DRX Cycle so as to keep the PDCCH monitoring activity in DRX cycle as in legacy if it occurs. If UE does not detect the WUS signal in the monitoring window or occasion that indicates UE to perform DRX operations in the next M DRX cycles, the UE will skip the PDCCH monitoring in the next M DRX cycles;

If detected, the legacy DRX operation is performed, e.g., UE turns ON at the beginning of the DRX cycle for a configured ON duration for PDCCH monitoring. The values of M maybe fixed in specifications or configured by higher layers and/or one value of M is dynamically indicated by WUS at least based on the real-time traffic characteristic of the said UE. In addition, $N_{gap}$ value may be reported by UE as part of UE capability and then configured accordingly. It is assumed that M=1 in FIG. 10.

For the fourth embodiment, a UE specific DCI may be used where the DCI may be scrambled with CRC based on C-RNTI or other configured RNTI. The DCI may have one or more fields to indicate the WUS trigger and/or start position of the configured ON duration for regular PDCCH monitoring. The start position may be indicated as offset to a reference point, e.g., SFN 0 or where DRX cycle starts or the location/CORESET where WUS is detected or when monitoring window for WUS ends. In one example, WUS trigger in a field in the DCI may not be needed if UE detects that the DCI format itself is solely for WUS. In one example, one field comprising K=>1 bits maybe used to indicate one from a set of supported values for the offset to start position of ON duration for regular PDCCH monitoring. In another example, the offset is set to a fixed value. In one example, if the DCI carrying WUS trigger match payload of other DCIs monitored by the UE, a flag can be used to identify the purpose. Moreover, some padding or filler bits maybe used to match the payload of a given DCI format. Alternatively, flag may not be needed because UE does not expect to receive other DCIs on or before receiving WUS. In one example, WUS may dynamically indicate ON duration, which can be longer or shorter than configured ON duration.

In some aspects, to allow for a power efficient receiver implementation, the WUS signal may be sent using ON-OFF keying, which can be detected based on an envelope detector.

In a fifth embodiment, L1 signaling may trigger WUS along with switching one or more DRX parameters. For example, L1 signaling may switch the UE to a short DRX cycle from a long DRX cycle.

UE may assume the configured values of drx-ShortCycle and drx-ShortCycleTimer or L1 signalling may indicate these values explicitly which in this case over-rides the configured values. Rest of the DRX parameters are RRC configured.

Further to fourth embodiment, the L1 trigger providing WUS may additionally indicate bandwidth part so that the UE wakes up in a different bandwidth part, FIG. 8. This implies UE enters active state in the new/indicated bandwidth part. UE may be in the new bandwidth part for a duration configured by a timer or until further signalling is received to switch. If a timer is configured, then upon expiry UE reverts back to previous or a given default bandwidth part and continue with configured DRX operation. A field comprising L=>1 bits may be used in the DCI to indicate one bandwidth part from a set of at most $\log_2 L$ supported bandwidth parts by the UE. In one example, UE may keep operating with a common DRX configuration for all bandwidth parts or when switched to a different bandwidth parts, UE may assume bandwidth part specific DRX configuration, if supported.

In another embodiment, the L1 signalling may additionally indicate the update on the number of PDCCH monitoring candidates during ON duration. In one option, as specified in NR specification, maximum number of monitored PDCCH candidates per slot and per serving cell is defined per subcarrier spacing. To reduce the UE complexity and power consumption, the maximum number of PDCCH candidates during ON duration can be reduced and the dropping rule for the PDCCH candidates can follow the rule as defined in the specification.

In another option, the maximum number of non-overlapped CCE per slot per serving cell for PDCCH channel estimation is defined per subcarrier spacing. Similar to the aforementioned option, the maximum number of non-overlapped CCEs via the L1 signalling can be updated and reduced for power saving. In another option, K set of PDCCH monitoring candidates during ON duration can be configured by higher layers via UE specific RRC signalling. The L1 signalling may dynamically indicate which one set of PDCCH monitoring candidates is used during the ON duration. For instance, one or more search space set or a subset of search space sets or one or more CORESET may be disabled for PDCCH monitoring during ON duration for power saving.

L1 Signaling for Both GTS and WUS

Figure 11:
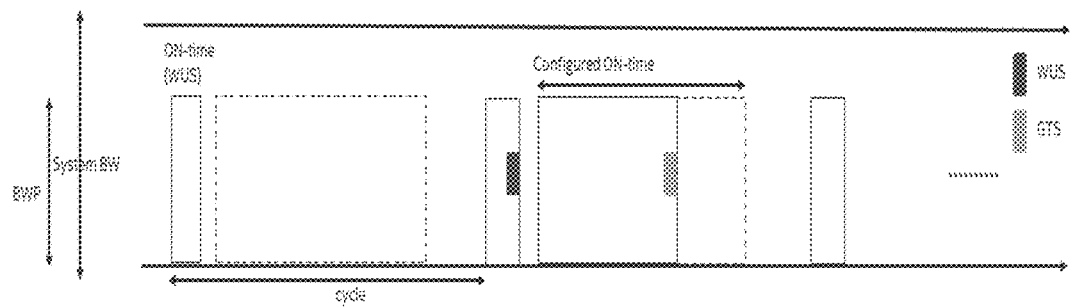
FIG. 11 shows an example where L1 signaling for WUS and GTS can be received by the UE to adjust ON/OFF duration.

In a sixth embodiment, separate L1 signaling, e.g., DCI in a PDCCH may be provided to UE for WUS and GTS. Individual features identified for L1 signaling for GTS and WUS mentioned above apply here too. In FIG. 11, UE starts monitoring, either after a gap (shown in the figure) or immediately, for regular PDCCH after detecting WUS. During configured ON duration for monitoring PDCCH, UE may receive GTS signaling so that UE can go to sleep early.

In one embodiment, a DCI format can be used for both WUS and GTS signaling. As monitoring occasions are mutually exclusive, no flag or identifier may be necessary. However, a flag may still be needed if payload matches other DCI format which can be simultaneously monitored, such as when monitoring for GTS signaling. The fields in the DCI format can be configurable in the sense that certain field may have different use depending on whether it is WUS or GTS signaling. For example, a field may be used to indicate sleep duration if it is GTS whereas same field maybe used to indicate ON duration if the DCI is for WUS. Furthermore, few common fields can be used such as BWP indication. Note that BWP indication in WUS and GTS may be independent or correlated.

In one example, a unified DCI format for WUS and GTS may have one or more of the following fields when UE is operating based on a RRC configured DRX mode:

A field to indicate offset to start of sleep or ON duration
    If received during ON state while monitoring PDCCHs or scheduling DCI: the field may indicate offset to start of sleep duration
    If received during WUS monitoring duration: the field may indicate offset to start of following ON duration for PDCCH monitoring A field to indicate duration of following sleep or ON duration
    If received during ON state while monitoring PDCCHs or scheduling DCI: the field may indicate sleep duration. The indicated sleep duration may span less or more than a DRX cycle.
    If received during WUS monitoring duration: the field indicates ON duration for PDCCH monitoring. The indicated sleep duration may span less or more than a DRX cycle.

A field to indicate bandwidth part ID.
    If received during ON state while monitoring PDCCHs or scheduling DCI: the field indicates the bandwidth part where UE turns ON in subsequent occasion.

If received during WUS monitoring duration: the field indicates the bandwidth part where UE wakes up and monitor scheduling DCI.

A field to indicate carrier.

A field to indicate the update on the number of PDCCH candidates.

This can be applicable to next M=>1 monitoring occasions or ON durations for PDCCH monitoring in next M DRX cycles.

Padded bits or filler bits.

In another example, one or more of the parameters listed above if not indicated in the DCI can be higher layer configured, e.g., indicated as part of a DRX configuration.

Type 2 DRX Mode Operation

Type 2 DRX mode operation assumes UE receives DCI signaling which activates DRX mode operation with a certain DRX configuration. Note that UE may be indicated one from a multiple of supported DRX configurations. The DRX configuration can be indicated as part of the activation signaling or can be indicated to the UE before by RRC signaling.

In one example, the L1 signaling providing the activation may also indicate one or more of the parameters listed in Table 1. e.g., L1 indication of some parameters may override higher layer configured parameters.

Next, depending on how DRX configuration and/or active/sleep state durations are adjusted, further classification of Type 2 can be obtained.

For type 2a, while the UE is operating in the DRX mode, RRC or MAC CE signaling can be provided to (re)-configure one or more parameters (or switch configuration) such as shown in Table 1.

Alternatively, as considered in type 1b, for faster adaptation. L1 signaling can be provided to update DRX parameters or switch configuration. Furthermore, L1 signaling can also be exploited to dynamically modify effective ON and OFF durations by means of go-to-sleep (GTS) and/or wake-up signal (WUS). The L1 signaling that provides GTS or WUS can be same or different than L1 signaling that activates the DRX mode or updates DRX parameters. Unless otherwise mentioned, it is assumed that network sends WUS or GTS signaling only when needed, otherwise network does not transmit anything at the monitoring occasion. Moreover, a combination of RRC/MAC CE and L1 signaling can be considered for updating DRX parameters and/or switching DRX configuration.

In one example, UE can be configured to receive one or more of the following L1 signaling, such as DCI in a PDCCH, Activation signaling Activation signaling with GTS, e.g., UE starts DRX cycle after an offset or sleep duration GTS signaling without activation, e.g., GTS signaling can be received independently, e.g., a GTS signaling can be received to put the UE in a micro-sleep, and after expiry, UE resumes DRX mode operation Deactivation signaling Deactivation signaling with WUS, e.g., WUS signaling itself serve or indicate deactivation of DRX mode WUS signaling without deactivation, e.g., UE just monitors for ON duration for PDCCH monitoring after WUS detection and does not leave DRX mode Embodiments that can be applicable to type 2b and type 2c are discussed infra.

GTS Only w/wo Activation/Deactivation Signaling

GTS signaling with activation implies L1 signaling that activates a DRX mode with a DRX configuration also puts the UE to sleep, either immediately or after an offset, and there can be a delay before DRX cycle starts. GTS signaling without activation implies UE is already in an activated DRX mode and L1 signaling for GTS puts the UE to sleep when the UE is ON as part of the DRX cycle.

Figure 12:
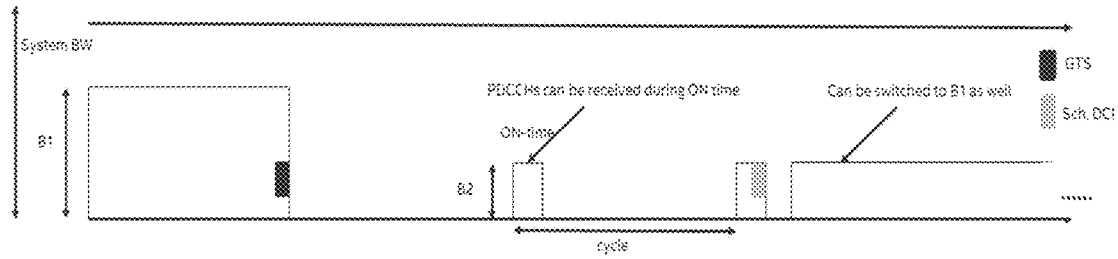
FIG. 12 shows an example of DCI providing GTS and/or activation of DRX mode, UE wakes up based on receiving scheduling DCI during configured/indicated ON time, and T_GTS_A is assumed to be zero.

In one embodiment. UE is in active state without any configured or activated DRX mode. UE can be configured to receive L1 signaling to activate DRX and/or provide GTS signaling. In particular, as shown in FIG. 12, UE receives GTS and/or DRX activation signaling and enters DRX mode when the UE is in active state and monitoring PDCCH. The DRX configuration can be configured a priori by RRC signaling or indicated as part of the L1 signaling that activates the DRX mode or put the UE to sleep. During the ON duration, UE can monitor for scheduling DCI and if received, it may exit the DRX mode, e.g., scheduling DCI serves as deactivation of the DRX mode. In one example, if the DRX ON duration starts after an offset following the L1 signaling activating DRX mode, this L1 activation signaling essentially also indicating GTS, such as shown in FIG. 12, the L1 signaling is essentially providing both activation of DRX mode and triggering the UE to go to sleep.

In FIG. 12, it is assumed that UE receives the GTS and/or activation in bandwidth part B1, and the L1 signaling may optionally indicate bandwidth part to the UE so that UE is in a different bandwidth part B1 during the active/ON state in the DRX mode. Smaller bandwidth part B2 compared to B1 may provide power saving gain.

For the above embodiment, a UE specific DCI, e.g., in a PDCCH, may be used for activating DRX mode and/or indicating GTS where the DCI may be scrambled with CRC based on C-RNTI or other higher layer configured RNTI. The DCI may also indicate the offset to the start position of sleep duration and/or sleep duration. The parameter $T\_GTS\_A$ is applicable here as well, cf. FIG. 2, e.g., UE can go to sleep immediately or sleep duration may start after a configured or indicated offset to a reference point. The DCI may have one or more fields to indicate the index of the DRX configuration and/or $T\_GTS\_A$. As discussed before, there can be higher layer configured set of configurations, and index of one configuration is indicated. Alternatively, the DCI indicates only selected set of DRX parameters and rest of the parameters are RRC configured. For example, DCI may have a field to indicate whether DRX mode is activated with short or long DRX cycle of a given DRX configuration. In another example, $T\_GTS\_A$ is not configured or indicated and subject to UE implementation/capability, e.g., how fast a UE can decode L1 trigger and consequently go to sleep. In one example, DCI may have a field to indicate an index corresponding to the value of sleep duration, where a set of supported values for sleep duration may be higher layer configured, such as by RRC signaling. In another example, offset to start position of sleep duration and/or sleep duration can be fixed in specifications. In one example, if the DCI carrying GTS/activation trigger may match payload of other DCIs monitored by the UE, a flag can be used to identify the purpose. Moreover, some padding or filler bits maybe used to match the payload of a given DCI format.

In another embodiment, the DCI signaling providing GTS/activation trigger may indicate bandwidth part and comprise a field of K=>1 bits. It implies that if bandwidth part is indicated, UE is active in the indicated bandwidth part during ON duration of the DRX mode. In one example, DRX configuration is not indicated explicitly and with the indication of bandwidth part, UE identifies DRX configuration if DRX configuration is associated with a bandwidth.

In another example, the indicated bandwidth part may be active for a given/configured time period and upon expiry, UE may switch back to a default or previous bandwidth part. When the UE switches back to the default or previous bandwidth part, it may continue with existing DRX mode configuration, e.g., configured ON duration, cycle etc. Alternatively, if bandwidth part specific DRX configuration is provided to UE, UE also switches DRX configuration when bandwidth part is changed.

For the embodiment considered in FIG. 12, separate wake up signal is not configured for the UE. Once the UE receives scheduling DCI, the UE may treat this scheduling DCI as deactivation DCI. Alternatively, UE may only prolong the ON duration following reception of scheduling DCI such as by the indicated drx-InactivityTimer or by another duration. In order to identify the behavior, the scheduling DCI sent to a UE that can be configured in DRX mode may have a field:
  If b=0 is detected in the field, UE goes back to sleep according to the DRX mode configuration after PDSCH is delivered or after a configured time.
  If b=1 is detected. UE may assume DRX mode is deactivated and UE stays active until further signaling is received.

In one example, the deactivation of the DRX is indicated by the L1 signaling different from scheduling DCI. As another option, the deactivation of DRX can be based on a timer, which can be predefined, configured by higher layer signaling, or indicated by the L1 signaling which activates the DRX.

In one example, the activation or GTS signaling may have one or more fields such as following:
  A field to indicate a first bandwidth part, e.g., a bandwidth part ID can be indicated that is used when UE turns ON for PDCCH monitoring as part of DRX cycle.
  A field to indicate the offset to the start of (first) DRX cycle following activation signaling
  A field to indicate a carrier.
  A field to indicate update on the number of PDCCH candidates to be monitored for during activated DRX mode.
  A field to indicate header or flag or identifier, if payload size of the DCI format matches another DCI format.
  A field to indicate an index corresponding to a DRX configuration.
  A field to indicate switching between parameters of a DRX configuration, e.g., switching from long to short DRX cycle.

In another embodiment, L1 signaling for activation and GTS are different. L1 signaling in a DCI activates DRX mode with a given or indicated DRX configuration and while the UE is ON as part of the DRX cycle, a separate L1 trigger maybe only provided to put the UE in a micro-sleep and UE wakes up after indicated duration or upon expiry of a configured timer. This operation may be performed when the UE is active state during the DRX cycle and UE observes a micro-sleep during active state. GTS signaling may indicate offset to start location of sleep duration and/or sleep duration. In another example, GTS signaling trigger microsleep may indicate UE to not monitor for following N=>1 PDCCH monitoring occasions.

WUS and at Least DRX Activation Signaling

In one example, L1 signaling, such as DCI in a PDCCH, may activate the DRX mode with a DRX configuration when the UE is ON. The UE may start the first DRX cycle following the L1 activation signaling after an offset which can be expressed in symbols/slots for a given numerology or in ms and the offset can be higher layer configured or dynamically indicated as part of the activation signaling.

A WUS monitoring window drx-onDurationTimer-WUS can be configured as part of the DRX cycle. During the monitoring window, UE looks for DCI for WUS e.g., in a PDCCH, and if detected, UE turns ON for a subsequent configured or indicated ON duration for PDCCH monitoring e.g., drx-onDurationTimer as part of the DRX cycle.

The activation signaling may have one or more fields such as following:
  A field to indicate a first bandwidth part, e.g., a bandwidth part ID can be indicated that is used when UE monitors for WUS.
  A field to indicate a second bandwidth part, e.g., a bandwidth part ID can be indicated that is used when UE monitors for regular PDCCHs following detection of WUS.
  A field to indicate the offset to the start of (first) DRX cycle following activation signaling.
  A field to indicate a carrier.
  A field to indicate update on the number of PDCCH candidates to be monitored for during activated DRX mode.
  A field to indicate header or flag or identifier, if payload size of the DCI format matches another DCI format.
  A field to indicate an index corresponding to a DRX configuration.

In one example, the first or second bandwidth part can be default bandwidth part or can be part of a DRX configuration. e.g., higher layer configured. Alternatively, second bandwidth part is not indicated as part of activation DCI and rather indicated as part of WUS DCI. In case first and second bandwidth part is same, only one is indicated, e.g., if UE does not switch bandwidth parts during DRX mode operation or if switching bandwidth parts is only indicated by WUS DCI or scheduling DCI.

In one example, if UE is configured to monitor WUS, the DRX cycle may start with the ON time for WUS monitoring, e.g., drx-onDurationTimer-WUS can be the duration at the beginning of a DRX Cycle instead of drx-onDurationTimer as in existing solutions that do not include WUS. In that context, drx-SlotOffset may indicate the delay before starting the drx-onDurationTimer-WUS. drx-onDurationTimer may start after an offset or immediately upon detection of WUS. Alternatively, in another example, DRX cycle can begin with drx-onDurationTimer as in legacy system and an offset can be configured to identify the location of WUS monitoring window, e.g., UE can be configured to turn ON for the WUS monitoring window, e.g., drx-onDuration-Timer-WUS before the configured location where drx-on-DurationTimer is supposed to start if WUS is detected where there can be an offset between when drx-onDurationTimer-WUS ends or WUS is detected and drx-onDurationTimer starts.

GTS w/wo Activation Signaling and WUS w/wo Deactivation Signaling

In one embodiment, an explicit WUS DCI is provided to the UE during a configured ON time where UE only monitors WUS and/or any other necessary measurement or synchronism signaling. WUS if detected may trigger the UE to be active during a subsequent configured or indicated ON duration where UE monitors for scheduling DCI and/or other transmissions from the network.

As discussed above in the context of type 1, the UE can be configured with drx-onDurationTimer-WUS in addition to drx-onDurationTimer and the UE periodically turns ON for drx-onDurationTimer-WUS to monitor WUS DCI. The offset to start position of the duration for monitoring scheduling DCI can be pre-configured or indicated as part of the WUS DCI. The offset can be a function of UE capability. Note that offset can be zero as well.

Figure 13:
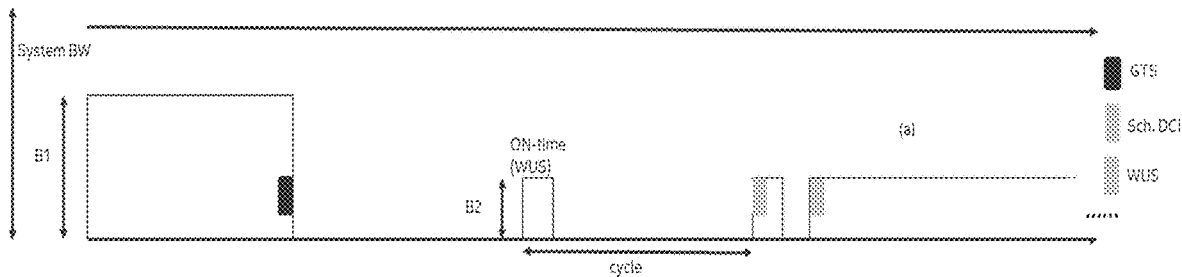
FIG. 13 shows an example where explicit WUS is provided to UE where WUS DCI may additionally also deactivate DRX mode to trigger the UE to wake up for a configured ON duration to monitor for scheduling DCI; GTS/activation signaling is provided prior to monitoring WUS.
Figure 14:
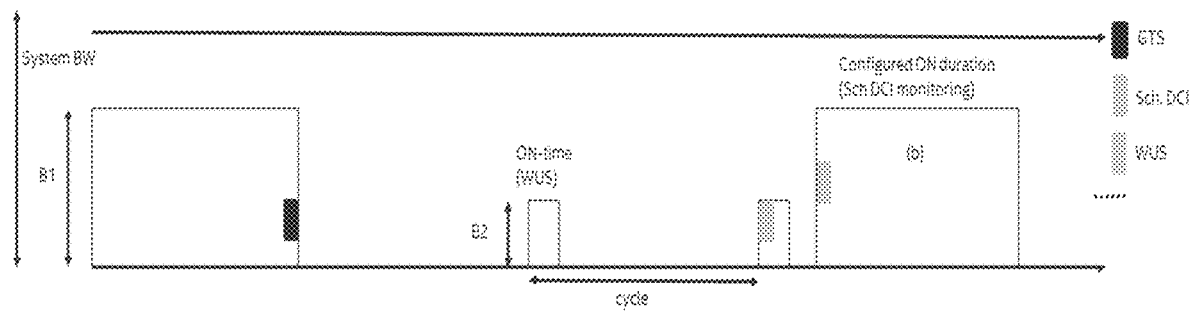
FIG. 14 shows an example where Explicit WUS is provided to UE where WUS DCI may additionally also deactivate DRX mode for different bandwidth parts; GTS/activation signaling is provided prior to monitoring WUS.

In one example, WUS DCI may additionally indicate whether UE exits the DRX mode or just wakes up for the subsequent ON duration for monitoring scheduling DCI. The DCI may have a field to at least indicate between these options, e.g., bit field=0 indicating exit DRX mode and bit field=1 indicating stay in DRX mode and just monitor scheduling DCI for configured ON duration, and vice versa. In FIG. 13, UE exits DRX mode upon receiving WUS and start monitoring scheduling DCI after an offset. Alternatively, offset may not exist and UE may start monitoring other DCIs immediately upon receiving WUS. Furthermore, WUS may indicate bandwidth part and UE monitors for scheduling DCI in the indicated bandwidth part. In FIG. 14, WUS indicates the UE to wake up and monitor for scheduling DCI during the configured ON duration in a different bandwidth part than where WUS was received. WUS may be monitored in a reduced bandwidth part to save power.

In one example, UE is only configured with ON duration to monitor WUS DCI and duration for monitoring scheduling DCI is explicitly indicated as part of WUS DCI or this duration is configured as part of DRX configuration. For example, DRX cycle can be quite long and WUS is monitored only over a thin ON duration periodically, effectively resulting in high sleep ratio. Network may dynamically indicate ON duration for monitoring PDCCH and other DCIs. Hence, effective continuous ON duration for monitoring scheduling DCI and other transmissions may be a combination of dynamically indicated ON duration and/or higher layer configured drx-InactivityTimer.

In one example, a unified DCI format can be used for indicating GTS and WUS and/or activation and deactivation of DRX mode. As transmission occasions of WUS and GTS are mutually exclusive, explicit indication of whether the DCI is sent for GTS or WUS may not be needed. For example, when the UE is in active state and monitoring scheduling DCI, it can only receive GTS. Similarly, when the UE is in DRX mode and turns ON from sleep state, it can only receive WUS. Hence, considering whether the DCI is for GTS or WUS, different bit fields may have different interpretations. The DCI format may have one or more fields such as:

A field to indicate activation and deactivation of DRX mode
  If received during active state while monitoring PDCCHs or scheduling DCI: the bit field=0 may imply activation, 1 may imply deactivation of DRX mode, vice versa
  If received during WUS monitoring duration: the bit field=0 may imply stay in activated DRX mode, 1 may imply deactivation of DRX mode, vice versa
A field to indicate offset to start of sleep or ON duration
  If received during active state while monitoring PDCCHs or scheduling DCI: the field may indicate offset to start of sleep duration
  If received during WUS monitoring duration: the field may indicate offset to start of following ON duration for PDCCH monitoring
A field to indicate duration of following sleep or ON duration
  If received during active state while monitoring PDCCHs or scheduling DCI: the field may indicate sleep duration
  The indicated sleep duration may span less or more than a DRX cycle
  If received during WUS monitoring duration: the field indicates ON duration for PDCCH monitoring
  The indicated sleep duration may span less or more than a DRX cycle
A field to indicate bandwidth part ID
  If received during active state while monitoring PDCCHs or scheduling DCI: the field indicates the bandwidth part where UE turns ON in subsequent occasion
  If received during WUS monitoring duration: the field indicates the bandwidth part where UE wakes up and monitor scheduling DCI
A field to indicate carrier
A field to indicate the update on the number of PDCCH candidates
Padded bits or filler bits In one example, there can be a GTS signaling that does not include activation signaling, e.g., GTS signaling without activation, such as when UE is in an activated DRX mode and UE may receive a separate GTS signaling when it is ON as part of the DRX cycle where the GTS signaling mat trigger the UE to go to sleep before the configured ON duration expires. UE can monitor WUS at configured occasions following GTS and/or activation signaling.

Although different types and corresponding embodiments are identified corresponding to different DCI based DRX mode operation, it should be understood that embodiments and corresponding descriptions under one type, if relevant, apply to descriptions and more generally under the scope of the other type as well. For example, some properties related to GTS and/or WUS signaling (e.g., content of GTS and/or WUS signaling and/or WUS monitoring configuration, e.g., monitoring window and/or offset between WUS monitoring window and PDCCH monitoring window) can be applied to either types. The only aspect that is different between type 1 and 2 is how DRX mode is activated, e.g., either L1 or RRC signaling. Rest of the features that are described in examples for either types, such as switching DRX configuration or adaptive parameters, GTS and/or WUS signaling design, etc, can be common for either types.

In one example, RRC signaling can turn ON/OFF monitoring WUS and/or GTS for a given UE, e.g., not all UE may be able to monitor these signalings. If monitoring GTS and/or WUS is disabled, UE follows existing DRX configuration for ON and OFF durations as part of DRX cycle. For example, there can be parameters such as WUS_monitoring and/or GTSsignal_monitoring can be ON or OFF, where parameters are higher layer configured/indicated. This implies higher layer configuration signaling may enable or disable WUS and/or GTS signaling monitoring.

In one example, RRC signaling or L1 signaling may activate the DRX mode which may expire based on a timer. For example, if UE receives subsequent L1 signaling trigger such as WUS or scheduling DCI in ON duration, which may serve as indication to terminate DRX mode, otherwise UE may continue to operate in DRX mode until the timer expires.

In one example, UE may not be configured with a DRX configuration or may not have any activated DRX configuration (e.g., neither type 1 or 2) and L1 signaling for GTS dynamically puts the UE to sleep for one instance. In this context, the L1 trigger or GTS DCI may have one or more fields to indicate the duration of the sleep and/or start position of the duration. Alternatively, MAC CE signaling can trigger the UE to go to sleep and the offset to start position of sleep duration and/or sleep duration can be indicated as part of MAC CE signaling or higher layer configured as property of the GTS trigger. Furthermore, UE may be configured with one or more configurations for sleep duration and/or offset to start position of sleep duration following the GTS trigger. In such case. MAC CE or RRC signaling or L1 signaling providing GTS trigger may also indicate one or more index corresponding to the configuration.

Prioritization of Signaling: UE Behavior

In some cases, L1 signaling may indicate a sleep or active state duration that may override existing configured values. For example, if GTS DCI indicates a sleep duration that spans multiple DRX cycles, UE takes DCI indication over the configured values and follow the values indicated in the DCI. Similarly, if GTS signaling is received when a higher layer configured timer is running, e.g., drx-InactivityTimer. UE stops the timer and follow the indication in the L1 signaling.

Furthermore, UE may have drx-InactivityTimer and BWP-InactivityTimer running simultaneously. In one example, if BWP-InactivityTimer expires before drx-InactivityTimer, UE may be configured with few behaviors: 1) resume time remaining in drx-InactivityTimer after the switching time in the default bandwidth part, 2) ignore the time remaining in drx-InactivityTimer and sleep according to the DRX cycle and wake up in the default bandwidth part.

DCI Configuration

The DCI format conveying WUS and/or GTS signaling can be monitored in USS and CSS. In one example, DCI format can be of same size as another existing DCI format, such as DCI 1_0 or other compact DCI or GC DCI such as 2_0. Other DCI formats such as 0_0, 0_1, 1_1, 2_x, x=1, 2, 3 etc can also be considered for size matching. In another example, DCI payload size may be configured by higher layers via MSI, RMSI, OSI or RRC signaling. If there is overlap in monitoring occasion and resources, a header/flag can be used to distinguish the purpose of the DCI. Some of the fields in the DCI can be just filler bits, if same payload of another DCI format such as DCI 1_0 used.

In another example, UE is configured with a search space set and corresponding CORESET for monitoring M PDCCH candidates for the DCI formats. The aggregation level and M can be configured by higher layers via MSI, RMSI, OSI or RRC signaling. To reduce blind decoding attempts, the number of PDCCH candidates for the DCI format monitoring may be limited to a small value. Further, the M PDCCH candidates can be predefined in the specification, e.g., the first M PDCCH candidates for the configured/predefined aggregation level for the configured search space set and corresponding CORESET.

In one example, as part of search space configuration where the search space is associated with a CORESET configured in a bandwidth part, UE may receive one or more of the following parameters related to GTS signaling and/or WUS signaling and/or activation signaling and/or deactivation signaling:

PDCCH monitoring periodicity;
PDCCH monitoring offset;
PDCCH monitoring pattern;
PDCCH candidates per aggregation level, e.g., GTS can be monitored with multiple ALs whereas WUS may be detected with one AL.

In one example, search space configuration for monitoring GTS and WUS can be different.

In another example, DCI format may be assigned to same or different CORESET with separate monitoring configuration with same or different payload. Alternatively, UE may have N configurable UE spec RNTIs, e.g., one RNTI used for GTS DCI. In one example, a selected set of aggregation level AL may be supported for the DCI format carrying WUS and/or GTS, for e.g., only AL 8 or 16 may be supported to ensure robustness. In particular, in order to reduce detection complexity, WUS DCI may be detected with one or two supported AL values, which can be part of WUS DCI configuration, e.g., the search space where DCI is looked for.

In one example, GTS DCI may be configured with low value of AL, e.g., 1, 2, 4 etc., whereas WUS DCI may be configured with higher value of AL. This is because WUS detection maybe more critical than detection of GTS, because missing the former could potentially result in missing a number of following PDCCH transmissions.

In another example, transmission occasions of GTS may not be overlapped with other DCI transmission and/or the CORESET used for GTS transmission may or may not be shared with other UE specific or common DCI transmissions.

In one example, DCI format of transmission of GTS and/or WUS may have unique payload size. In another example, L1 signaling for GTS can be DCI based whereas L1 signaling for WUS can be sequence based, or vice versa.

In one example, drx-HARQ-RTT-TimerDL may start (e.g., may start from next symbol) after the expiry of duration indicated by PDSCH-to-HARQ_feedback timing indicator in the scheduling DCI, e.g., DCI format 1_1.

DCI Based Indication of Other Parameters

Although, reduction in unwanted PDCCH monitoring can improve UE power consumption by dynamic DRX mode management, some general signaling mechanisms can be used to activate/deactivate some parameters to improve UE power consumption with or without an active DRX mode operation in place.

In particular, for any of the DCI signaling embodiments considered above or as part of any scheduling DCI, one or more of the following parameters can be included in a UE specific DCI:

Activation and/or de-activation of secondary carriers
A K=>1 bit field can be used to indicate the carrier ID
Activation and/or de-activation of a set of UE antennas
A L=>1 bit field can be used to indicate indices or set of indices of UE antennas
Network and UE exchange UE antenna configuration and corresponding indices of the UE antennas prior to signaling for activation/deactivation.

Alternatively, MAC CE signaling can be used instead of DCI based signaling to activate/deactivate the parameter.

Sequence Based WUS Signaling

Embodiments herein provide several mechanisms to support network assistant wake-up signaling to indicate UE to switch from UE power efficient/saving mode (PSM) to network access mode (NAM). In particular, the design details of such network assistant wake-up signal (WUS) are provided.

The embodiments herein support WUS/DTX assisted C-DRX operation in new radio systems. In embodiments, a WUS shall be sent by network to signal UE to switch to network-access mode, e.g., Active Time mode in MAC, from power-saving mode, e.g., DRX. If no WUS is detected, the UE shall remain in power-saving mode. In embodiments, a WUS transmission occasion shall be configured in MAC entity with respect to the start slot of drx-onDuration.

In embodiments, a WUS basic sequence can be configured by network, it is transmitted in continuous RBs in time and/or frequency. The WUS basic sequence is ZC sequence scrambled with Gold sequence initialized by UE RNTI and some timing component, e.g., slot interval between the start slot of WUS occasion and the associated drx-onDuration.

In embodiments, a WUS resource set (WURESET) can be configured by RRC signaling, and the WURESET shall incorporate several WUS candidates with different repetition level. The actual WURESET at a given time shall be allocated in the current active BWP based on the configured WURESET per-BWP or per MAC entity.

The embodiments herein enable more power efficient C-DRX operation assisted by configured WUS/DTX transmission. The power efficient WUS detector can help the UE to skip the drx-onDuration when no data traffic is waiting in the MAC data buffer. The configurable WUS design of the embodiments herein further enables the trade-off among power consumption of WUS detection and potential WUS transmission blocking in order to achieve the overall optimal UE power consumption while controlling the impact on the transmission latency.

Configurable Wake-Up Signal/DTX Assisted C-DRX for NR

Figure 15:
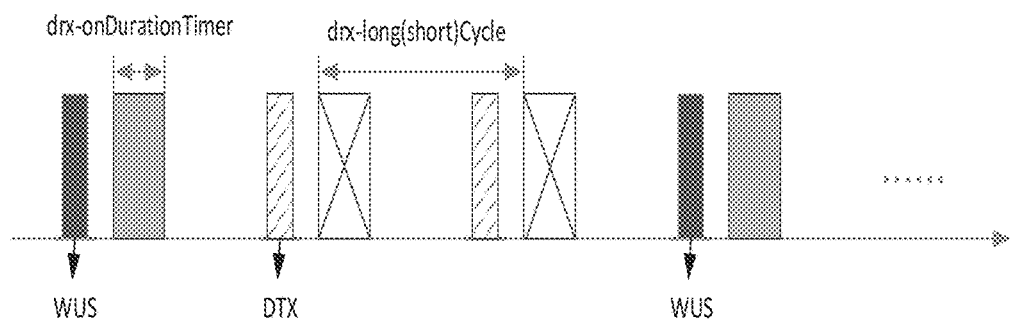
FIG. 15 illustrates WUS/DTX assisted C-DRX in NR.

The basic principle of WUS/DTX assisted C-DRX (RRC-Connected mode DRX) is illustrated in FIG. 15. Specifically, a UE can be configured with WUS/DTX signal which is associated with each drx-onDuration occasion. If the WUS is detected by the UE, UE shall enter the "network access mode" (NAM), e.g., MAC entity switching to "Active Time", during the associated drx-onDuration period in which the PDCCH monitoring is carried out. Otherwise if no WUS is detected, the UE shall remain in power efficient/saving mode. e.g., MAC entity in "non-active time" during the associated drx-onDuration occasion so that no PDCCH monitoring is performed.

Wake-Up Signal Transmission

Basic WUS Sequence

The basic WUS can be a sequence mapped to consecutive X (e.g., X=6) RBs in one or several consecutive OFDM symbols. The sequence can be generated in a similar way as LTE NB-IoT WUS, e.g., a ZC sequence with Gold sequence based cover code, and the cover code sequence can be initialized by UE-specific parameter, e.g., configured UE C-RNT, as well as some time component such as the slot interval between the first slot containing the WUS transmission and the associated drx-onDuration occasion.

For example, the sequence can be generated according to the following equations.

$$d_{wus}(n) = c(m) \cdot e^{-j\pi un'(n'+1)/L_{ZC}}$$ [Equation 1]

$$d_{WUS}(n) = c(m) \cdot d_{SSS}(n')$$ [Equation 2]

$$d_{WUS}(n) = c(n)$$ [Equation 3]

where $n' = n \bmod L_{ZC}$ for Alt-1 and $n' = n \bmod L_{SSS}$ for Equation 2.

$d_{SSS}(n')$ is the NR SSS sequence $M = n \bmod (\text{length of } c(m))$ $L_{ZC} = X*12$ $c(m)$: Gold sequence is used as RE-level cover codes
  $c(m)$ is generate the same as RE-level scrambling of LTE Rel-14 NPDCCH/NPDSCH
  It can be initialized at the start of WUS with $c_{init\_WUS} = (n_{RNTI}2^{16} + N_{ID}) \bmod 2^{31}$, or $c_{init\_WUS} = (n_{RNTI}2^{18} + (n_{sl\_O}-1)2^{16} + N_{ID}) \bmod 2^{31}$ (Note 1)

$N_{ID}$: physical cell ID or high layer (e.g., RRC) configured parameter.

$n_{sl\_O}$: the number of slot interval between the (first) slot of configured WUS/DTX and start slot of the associated drx-onDuration occasion, it can range from 1 to $n_{sl\_O}^{MAX}$, where $n_{sl\_O}^{MAX}$ can be fixed in the specification.

Note 1: $n_{sl\_O}^{MAX} = 4$.

WUS Candidate

Each WUS candidate can be comprised of one or several basic WUS sequence depending on the repetition level of the WUS candidate. It is natural that the WUS with small repetition level can be used for UEs in high geometry region while the WUS with large repetition level for UEs in low geometry region. In each WUS occasion, network can choose a specific WUS candidate to wake up the UE for the associated upcoming drx-onDuration occasion.

WUS Resource Set (WURESET)

Figure 16:
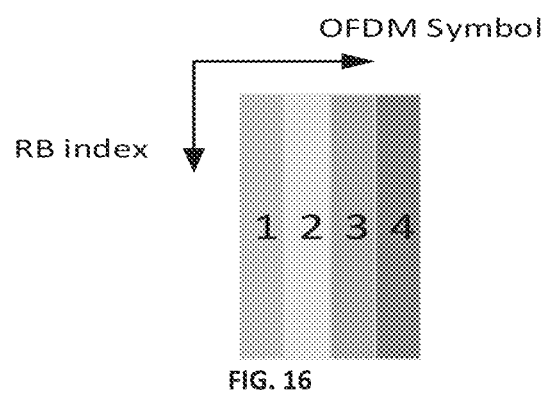
FIG. 16 illustrates a WURESET, Y basic WUS sequences in continuous time domain.
Figure 17:
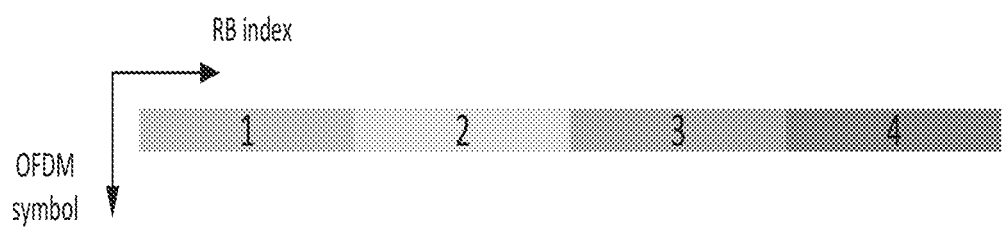
FIG. 17 illustrates a WURESET, Y basic WUS sequences in continuous freq. domain.
Figure 18:
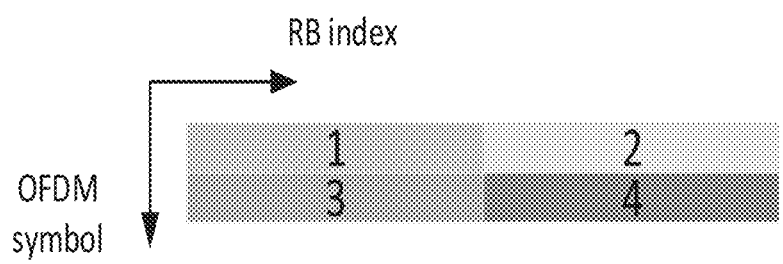
FIG. 18 illustrates a WURESET, Y basic WUS sequences in continuous time-freq. domain

The resource set configured for WUS occasion may be comprised of a set of Y basic WUS sequences allocated in continuous time and/or frequency domain. As the examples shown in FIGS. 16-18, the WURESET comprises Y=4 WUS basic sequences, as such the WURESET contains 4 repetition-level-1 (RL1) WUS candidates, 2 RL2 WUS candidates and 1 RL4 WUS candidate. Specifically, the RL2n candidate can be constructed by 2 consecutive RLn candidates. For example, in the WURSET illustrated in above figures, it has 4 WUS basic sequences, namely, WUS #1, #2, #3 and #4 which are the RL1 WUS candidates. Two RL-2 WUS candidates, named as RL2-WUS #1, and RL2-WUS #2, can be formed by WUS #1+WUS #2, and WUS #3+WUS #4, respectively. And the single RL4 WUS candidate contains all WUSs in the WURESET.

WURESET Configuration

Since the WUS transmission occasion, determined by $n_{sl\_O}$, shall be defined with respect to drx-long(short)Cycle-Start, it is therefore logical to configure WUS transmission occasion in the MAC entity where DRX is configured.

As described above, the WURESET configuration includes the time-frequency resources for WUS candidates, e.g., RBs and symbols within the WUS occasion slot(s). Since UE can be configured with multiple bandwidth parts (BWPs) with possibly different bandwidths, with C-DRX, UE can operate in any active BWP other than the default BWP based on the state of bwp-inactivityTimer. As such, the momentary/active WURESET configuration shall be defined in the current active BWP. In one option, WURESET can be configured per-BWP, and the WURESET in the active BWP shall be used for a given WUS transmission occasion. As a result, the BWP switching won't be required during the transition from PSM to NAM. In another option, WURESET can be configured per MAC entity, in this case, the actual start RB index of WURESET shall be in the valid range of the active BWP. For example, the WURESET-Config can be defined in MAC-Config as follows:

---

WURESET-Config := {
  • Start-RBIndex: 0:MaxRBIndex−1
  • Num-RBs: MinWURESETBW:MaxWURESETBW
  • Start-OSIndex: 0:13
  • Num-OSs: 1:14
} where

Start-RBIndex ($k_{Start}^{WURESET}$): the start RB index of WURESET

Num-RBs ($N_{RB}^{WURESET}$): the number of RBs in WURESET

Start-OSIndex: the first OS index of WURESET within the first slot of WUS occasion Num-OSs: the number of OSs in WURESET Given the particular BW of the active BWP, the actual start RB index of WURESET in the active BWP shall be further calculated as follows $$k_{Start}^{WURESET\text{-}active} = k_{Start}^{WURESET} \mod (N_{RB}^{BWP\text{-}active} - N_{RB}^{WURESET} + 1)$$

where $k_{Start}^{WURESET\text{-}active}$ is the start RB index of WURESET in the current active BWP $N_{RB}^{BWP\text{-}active}$ is the bandwidth of the current active BWP

EXAMPLES

Example 1 includes a method for new radio (NR) communications, the method comprising: receiving or causing to receive, by a UE, in a first bandwidth part, a first control: signaling or causing to signal the control signaling providing activation of DRX mode with at least one DRX configuration, wherein the DRX configuration includes at least the parameters indicated in Table 1; receiving or causing to receive by the UE, a second control signaling, the second control signaling providing go-to-sleep trigger, while the UE is ON during the configured DRX mode, going or causing to go to sleep for a first duration; and waking or causing to wake up following the expiry of the first duration in a second bandwidth part and resuming the DRX operation according to the DRX configuration. Example 2 includes the method of example 1 and/or some other examples herein, wherein a first control signaling is received by UE specific RRC signaling. Example 3 includes the method of example 1 and/or some other examples herein, wherein the second control signaling is received by UE specific PDCCH signaling. Example 4 includes the method of example 3 and/or some other examples herein, wherein the PDCCH indicates the first duration. Example 5 includes the method of example 3 and/or some other examples herein, wherein the PDCCH indicates ID of second bandwidth part. Example 6 includes the method of example 1 and/or some other examples herein, wherein the second bandwidth part is smaller than the first bandwidth part. Example 7 includes an apparatus comprising: C-DRX means for operating according to a configured C-DRX mode within a BWP or a carrier, wherein a configuration of the C-DRX mode indicates a given DRX cycle with a configured ON duration for operating in an ON state: and monitoring means for monitoring L1 signaling for a go-to-sleep (GTS) signal and/or a wake-up-signal (WUS) during the ON state of the DRX cycle. Example 8 includes the apparatus of example 7 and/or some other examples herein, further comprising sleeping means is for placing the apparatus in a sleep state in response to receipt of the GTS signal before expiration of the ON duration and/or upon expiration of a drx-InactivityTimer. Example 9 includes the apparatus of example 8 and/or some other examples herein, wherein the C-DRX means is for triggering a micro-sleep within the ON duration based on the GTS signal. Example 10 includes the apparatus of examples 7-9 and/or some other examples herein, further comprising means for receiving a UE specific DCI, the DCI indicating new DRX parameters, wherein CRC bits of the DCI are scrambled by C-RNTI or other dedicated RNTI, which can be configured by higher layers via NR minimum system information (MSI), NR remaining minimum system information (RMSI), NR other system information (OSI), or radio resource control (RRC) signaling. Example 11 includes the apparatus of example 10 and/or some other examples herein, wherein the DCI includes one or more fields to indicate the GTS trigger and/or a T_GTS_A and T_GTS_B, wherein the one or more fields indicating the T_GTS_A and/or the T_GTS_B has K=>1 bits to indicate an index of a pair of T_GTS_A and T_GTS_B or separate fields can be used for indication, wherein each field has one or more bits. Example 12 includes the apparatus of examples 7-11 and/or some other examples herein, further comprising means for receiving L1 signaling to trigger the GTS and to switch one or more DRX parameters. Example 13 includes the apparatus of example 12 and/or some other examples herein, wherein the L1 signaling is to further indicate a bandwidth part to cause the apparatus to wake up in a different bandwidth part for a duration configured by a timer or until further signalling is received. Example 14 includes the apparatus of example 13 and/or some other examples herein, further comprising means for reverting back to a previous or given default bandwidth part upon expiration of the timer when the timer is configured, and for causing the C-DRX means for operating according to the configured DRX operation. Example 15 includes the apparatus of examples 7-14 and/or some other examples herein, further comprising means for determining a WUS monitoring duration from a received configuration, wherein the WUS monitoring duration is to indicate a period during which the apparatus is to be in the ON state during every DRX cycle unless a WUS is detected. Example 16 includes the apparatus of example 15 and/or some other examples herein, further comprising means for entering the ON state in response to detecting the WUS, and causing the monitoring means to monitor for a regular PDCCH and/or other signaling for a configured ON duration. Example 17 includes the apparatus of examples 15-16 and/or some other examples herein, further comprising means for receiving a UE specific DCI, the DCI indicating a WUS trigger and/or a start position of the configured ON duration for regular PDCCH monitoring, wherein CRC bits of the DCI are scrambled by C-RNTI or other RNTI, which can be configured by higher layers via NR MSI, NR RMSI, NR OSI, or RRC signaling, wherein the start position is indicated as an offset to a reference point, where the DRX cycle starts, a location/CORESET where the WUS is detected, or when the monitoring duration for WUS ends. Example 18 includes the apparatus of examples 15-16 and/or some other examples herein, further comprising means for receiving the WUS signal using ON-OFF keying; and envelope detector means for detecting the WUS signal and/or the ON-OFF keying. Example 19 includes the apparatus of examples 7-18 and/or some other examples herein, further comprising means for receiving L1 signaling, the L1 signaling to trigger the WUS along with switching one or more DRX parameters. Example 20 includes the apparatus of example 19 and/or some other examples herein, wherein the L1 signaling additionally indicates a bandwidth part to wake up in a different bandwidth part for a duration configured by a timer or until further signalling is received to switch. Example 21 includes the apparatus of examples 19-20 and/or some other examples herein, further comprising means for reverting back to a previous or default bandwidth part upon expiration of the timer when the timer is configured, and for causing the C-DRX means for operating according to the configured DRX operation. Example 22 includes the apparatus of examples 19-21 and/or some other examples herein, wherein the DCI is to include a field comprising L=>1 bits to indicate one bandwidth part from a set of at most $\log_2 L$ supported bandwidth parts. Example 23 includes the apparatus of examples 19-22 and/or some other examples herein, wherein the L1 signalling additionally indicates an update on a number of PDCCH monitoring candidates to be monitored during the ON duration. Example 24 includes the apparatus of examples 7-23 and/or some other examples herein, further comprising means for receiving separate L1 signaling for WUS and GTS. Example 25 includes the apparatus of example 24 and/or some other examples herein, wherein a new DCI format is used for both WUS and GTS signaling. Example 26 includes the apparatus of examples 24-25 and/or some other examples herein, further comprising means for activating DRX and/or provide GTS signaling in response to receipt of the L1 signaling. Example 27 includes the apparatus of examples 24-26 and/or some other examples herein, further comprising means for receiving scheduling DCI, and means for treating the scheduling DCI as a deactivation DCI. Example 28 includes the apparatus of examples 24-26 and/or some other examples herein, further comprising means for receiving scheduling DCI, and means for prolonging the ON duration following reception of the scheduling DCI such as by the indicated drx-InactivityTimer or by another duration. Example 29 includes the apparatus of examples 7-28 and/or some other examples herein, further comprising means for receiving first L1 signaling for activation and second L1 signaling for GTS, wherein the first L1 signaling in a DCI activates DRX mode with a given or indicated DRX configuration and while in the ON state as part of the DRX cycle, and the second L1 signaling indicates an offset to start location of sleep duration and/or sleep duration or a trigger to enter a micro-sleep state during which to not monitor for following N=>1 PDCCH monitoring occasions. Example 30 includes the apparatus of examples 7-29 and/or some other examples herein, further comprising means for receiving an explicit WUS DCI during a configured ON time; and means for triggering an active state in response to detecting the WUS during a subsequent configured or indicated ON duration. Example 31 includes the apparatus of examples 7-30 and/or some other examples herein, wherein MAC CE signaling is used instead of DCI based signaling to activate/deactivate the parameters. Example 32 includes the apparatus of examples 7-31 and/or some other examples herein, wherein the apparatus is implemented in or by a user equipment (UE). Example 33 may include an apparatus comprising means to perform one or more elements of a method described in or related to any of examples 1-32, or any other method or process described herein. Example 34 may include one or more non-transitory computer-readable media comprising instructions to cause an electronic device, upon execution of the instructions by one or more processors of the electronic device, to perform one or more elements of a method described in or related to any of examples 1-32, or any other method or process described herein. Example 35 may include an apparatus comprising logic, modules, or circuitry to perform one or more elements of a method described in or related to any of examples 1-32, or any other method or process described herein. Example 36 may include a method, technique, or process as described in or related to any of examples 1-32, or portions or parts thereof. Example 37 may include an apparatus comprising: one or more processors and one or more computer-readable media comprising instructions that, when executed by the one or more processors, cause the one or more processors to perform the method, techniques, or process as described in or related to any of examples 1-32, or portions thereof. Example 38 may include a signal as described in or related to any of examples 1-32, or portions or parts thereof. Example 39 may include a signal in a wireless network as shown and described herein. Example 40 may include a method of communicating in a wireless network as shown and described herein. Example 41 may include a system for providing wireless communication as shown and described herein. Example 42 may include a device for providing wireless communication as shown and described herein.

Example 1A includes a method of WUS/DTX assisted C-DRX (RRC-Connected mode DRX), wherein a UE can be configured with WUS/DTX signal which is associated with each drx-onDuration occasion. Example 2A includes the method of example 1A and/or some other examples herein, wherein, if the WUS is detected by the UE, UE shall enter the "network access mode" (NAM), e.g., MAC entity switching to "Active Time", during the associated drx-onDuration period in which the PDCCH monitoring is carried out. Otherwise if no WUS is detected. UE shall remain in power efficient/saving mode, e.g., MAC entity in "non-active time" during the associated drx-onDuration occasion so that no PDCCH monitoring is performed. Example 3A includes the method of example 1A and/or some other examples herein, wherein the basic WUS can be a sequence mapped to consecutive X (e.g., X=6) RBs in one or several consecutive OFDM symbols. Example 4A includes the method of example 3A and/or some other examples herein, wherein the sequence can be generated according to Alt-1: $d_{wus}(n)=c(m)\cdot e^{-j\pi un'(n'+1)/L_{ZC}}$, Alt-2: $d_{WUS}(n)=c(m)\cdot d_{SSS}(n')$, and/or Alt-3: $d_{WUS}(n)=c(n)$, wherein n'=n mod $L_{ZC}$ for Alt-1 and n'=n mod $L_{SSS}$ for Alt-2, $d_{SSS}(n')$ is the NR SSS sequence, M=n mod (length of c(m)), $L_{ZC}$=X*12, c(m): Gold sequence is used as RE-level cover codes, c(m) is generate the same as RE-level scrambling of LTE Rel-14 NPDCCH/NPDSCH, and wherein it can be initialized at the start of WUS with $c_{init\_WUS}=(n_{RNTI}2^{16}+N_{ID})$mod $2^{31}$ or $c_{init\_WUS}=(n_{RNTI}2^{18}+(n_{sl\_O}-1)2^{16}+N_{ID})$mod $2^{31}$ wherein $n_{sl-O}^{MAX}$=4, and wherein $N_{ID}$ is physical cell ID or high layer (e.g., RRC) configured parameter, and $n_{sl\_O}$ is the number of slot interval between the (first) slot of configured WUS/DTX and start slot of the associated drx-onDuration occasion, it can range from 1 to $n_{sl-O}^{MAX}$, where $n_{sl-O}^{MAX}$ can be fixed in the specification. Example 5A includes the method of examples 3-4A and/or some other examples herein, wherein the cover code sequence c(n) in example 4A or some other example herein can be initialized by UE-specific parameter, e.g., configured UE C-RNTI, as well as some time component such as the slot interval between the first slot containing the WUS transmission and the associated drx-onDuration occasion. Example 6A includes the method of example 1A and/or some other examples herein, wherein each WUS candidate can be comprised of one or several basic WUS sequence depending on the repetition level of the WUS candidate, wherein the WUS with small repetition level can be used for UEs in high geometry region while the WUS with large repetition level for UEs in low geometry region. Example 7A includes the method of example 6A and/or some other examples herein, wherein in each WUS occasion, network can choose a specific WUS candidate to wake up the UE for the associated upcoming drx-onDuration occasion. Example 8A includes the method of example 1A and/or some other examples herein, wherein a resource set configured for WUS occasion comprises a set of Y basic WUS sequences allocated in continuous time and/or frequency domain. Example 9A includes the method of example 8A and/or some other examples herein, wherein WUS resource set (WURESET) comprises Y=4 WUS basic sequences, as such the WURESET contains 4 repetition-level-1 (RL1) WUS candidates, 2 RL2 WUS candidates and 1 RL4 WUS candidate. Example 10A includes the method of examples 8-9A and/or some other examples herein, wherein the RL2n candidate can be constructed by 2 consecutive RLn candidates. For example, in the WURSET illustrated in above figures, it has 4 WUS basic sequences, namely, WUS #1, #2, #3 and #4 which are the RL1 WUS candidates. Two RL-2 WUS candidates, named as RL2-WUS #1, and RL2-WUS #2, can be formed by WUS #1+WUS #2, and WUS #3+WUS #4, respectively. And the single RL4 WUS candidate contains all WUSs in the WURESET. Example 11A includes the method of example 1A and/or some other examples herein, wherein since the WUS transmission occasion, determined by $n_{s1\_O}$, shall be defined with respect to drx-long(short)CycleStart, the WUS transmission occasion can be configured in the MAC entity where DRX is configured. Example 12A includes the method of example 11A and/or some other examples herein, wherein the WURESET configuration includes the time-frequency resources for WUS candidates, e.g., RBs and symbols within the WUS occasion slot(s). Example 13A includes the method of examples 11-12A and/or some other examples herein, wherein the momentary/active WURESET configuration can be defined in the current active BWP. Example 14A includes the method of examples 11-13A and/or some other examples herein, wherein in one option, WURESET can be configured per-BWP, and the WURESET in the active BWP shall be used for a given WUS transmission occasion. Example 15A includes the method of examples 11-14A and/or some other examples herein, wherein in another option, WURESET can be configured per MAC entity, in this case, the actual start RB index of WURESET shall be in the valid range of the active BWP. Example 16A includes the method of examples 11-15A and/or some other examples herein, wherein the WURESET-Config in example 15A or some other example herein can be defined in MAC-Config as follows:

```
WURESET-Config := {
   Start-RBIndex: 0:MaxRBIndex-1
   Num-RBs: MinWURESETBW:MaxWURESETBW
   Start-OSIndex: 0:13
   Num-OSs: 1:14
}
``` wherein Start-RBIndex ($k_{Start}^{WURESET}$): the start RB index of WURESET, Num-RBs ($N_{RB}^{WURESET}$): the number of RBs in WURESET. Start-OSIndex: the first OS index of WURESET within the first slot of WUS occasion. Num-OSs: the number of OSs in WURESET. Example 17A includes the method of examples 11-16A and/or some other examples herein, wherein given the particular BW of the active BWP, the actual start RB index of WURESET in the active BWP shall be further calculated as follows:

$$k_{Start}^{WURESET-active} = k_{Start}^{WURESET} \mod (N_{RB}^{BWP-active} - N_{RB}^{WURESET} + 1)$$

wherein $k_{Start}^{WURESET-active}$ is the start RB index of WURESET in the current active BWP, and $N_{RB}^{BWP-active}$ is the bandwidth of the current active BWP. Example 18A may include an apparatus comprising means to perform one or more elements of a method described in or related to any of examples 1-17, or any other method or process described herein. Example 19A may include one or more non-transitory computer-readable media comprising instructions to cause an electronic device, upon execution of the instructions by one or more processors of the electronic device, to perform one or more elements of a method described in or related to any of examples 1-17A, or any other method or process described herein. Example 20A may include an apparatus comprising logic, modules, or circuitry to perform one or more elements of a method described in or related to any of examples 1-17A, or any other method or process described herein. Example 21A may include a method, technique, or process as described in or related to any of examples 1-17A, or portions or parts thereof. Example 22A may include an apparatus comprising: one or more processors and one or more computer-readable media comprising instructions that, when executed by the one or more processors, cause the one or more processors to perform the method, techniques, or process as described in or related to any of examples 1-17A, or portions thereof.

In Example 1B, an apparatus for a user equipment (UE), the apparatus comprises: memory and processing circuitry, wherein, the processing circuitry is to: when directed to do so by a next generation evolved Node B (gNB), operate in a discontinuous reception (DRX) mode according to an indicated DRX configuration while in a radio resource control (RRC) connected state, wherein a DRX cycle includes an Active state during which the UE monitors for downlink control information (DCI) for scheduling data transmission from the gNB via a physical downlink control channel (PDCCH) and a non-Active state during which the UE is allowed to not monitor for DCI for scheduling data transmission in order to conserve battery power; after receiving from the gNB a higher layer configuration signaling which triggers the UE to monitor for a wake-up signal in DRX mode, monitor for a wake-up signal (WUS) during the non-Active state at configurable monitoring occasions, wherein the WUS is sent from the gNB via the DCI in a PDCCH; and, after detecting the WUS, enter the Active state at least for a configurable duration to monitor for DCIs for scheduling data transmission. The processing circuitry may be to receive the higher layer configuration signaling via RRC signaling. The processing circuitry may be to detect the PDCCH carrying a WUS using a dedicated or configured radio network temporary identifier (RNTI). The processing circuitry may be to monitor and detect the PDCCH carrying a WUS in a search space as configured and signaled by the gNB. The processing circuitry may be to decode the PDCCH carrying a WUS at an aggregation level setting the number of control channel elements (CCEs) in the PDCCH as configured and signaled by the gNB. The processing circuitry may be to monitor for WUS at one or more monitoring occasions that start at an offset before the Active state duration of the DRX cycle, the offset being configured and signaled by the gNB. The processing circuitry may be to, when waking up after WUS is detected, wake up to be in Active state in a bandwidth part (BWP) indicated by the WUS. The processing circuitry may be to detect a WUS by searching for a dedicated DCI format transmitted in a PDCCH. The processing circuitry may be to monitor and detect the PDCCH carrying a WUS in a UE specific search space.

In Example 1C, an apparatus for a next generation evolved Node B (gNB), the apparatus comprises: memory and processing circuitry, wherein the processing circuitry is to: encode a command to be transmitted to a user equipment (UE) that directs the UE to operate in a discontinuous reception (DRX) mode according to an indicated DRX configuration while in a radio resource control (RRC) connected state, wherein a DRX cycle includes an Active state during which the UE monitors for downlink control information (DCI) for scheduling data transmission from the gNB via a physical downlink control channel (PDCCH) and a non-Active state during which the UE is allowed to not monitor for DCI for scheduling data transmission in order to conserve battery power: via higher layer configuration signaling, trigger the UE to monitor for a wake-up signal (WUS) during the non-Active state at configurable monitoring occasions, therein the WUS is sent from the gNB via the DCI in a PDCCH; and, wherein the WUS commands the UE to enter the Active state at least for a configurable duration to monitor for DCIs for scheduling data transmission. The processing circuitry may be to implement the higher layer configuration signaling via RRC signaling. The processing circuitry may be to encode the PDCCH carrying a WUS using a dedicated or configured radio network temporary identifier (RNTI). The processing circuitry may be to encode the PDCCH carrying a WUS in a configurable search space that is signaled to the UE. The processing circuitry may be to encode the PDCCH carrying a WUS at a configurable aggregation level signaled to the UE that sets the number of control channel elements (CCEs) in the PDCCH. The processing circuitry may be to configure and signal to the UE an offset, wherein the UE is to monitor for WUS at monitoring occasions that start at an offset before the Active state duration of the DRX cycle. The processing circuitry may be to encode the GTS with information commanding the UE to, when waking up after WUS is detected, wake up to be in Active state in a bandwidth part (BWP) indicated by the WUS. The processing circuitry may be to encode a WUS using a dedicated DCI format in the PDCCH.

In Example 1D, a non-transitory computer-readable storage medium comprises instructions to cause processing circuitry of a UE or gNB, upon execution of the instructions by the processing circuitry, to perform any of the function recited in the Examples herein.

The above detailed description refers to the accompanying drawings. The same reference numbers may be used in different drawings to identify the same or similar elements. In the above description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The embodiments as described above may be implemented in various hardware configurations that may include a processor for executing instructions that perform the techniques described. Such instructions may be contained in a machine-readable medium such as a suitable storage medium or a memory or other processor-executable medium.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

The invention claimed is:

1. An apparatus comprising:
a memory; and
processing circuitry in communication with the memory, wherein the processing circuitry is configured to:
operate a user equipment (UE), when directed by a base station, in a discontinuous reception (DRX) mode according to an indicated DRX configuration while in a radio resource control (RRC) connected state, wherein a DRX cycle indicated by the DRX configuration includes an Active state during which the UE monitors for downlink control information (DCI) for scheduling data transmission from the base station via a physical downlink control channel (PDCCH) and a non-Active state during which the UE is allowed to not monitor for DCI for scheduling data transmission in order to conserve battery power;
after receiving from the base station, a higher layer configuration signaling which triggers the UE to monitor for a wake-up signal while in the DRX mode, monitor for a wake-up signal (WUS) during the non-Active state at configurable monitoring occasions, wherein the WUS is sent from the base station via the DCI in the PDCCH;
detect the WUS by searching for a dedicated DCI format transmitted in the PDCCH, wherein the WUS includes an indication of a bandwidth part, wherein the indication indicates a first bandwidth is to be monitored in the Active state; and
after detecting the WUS, enter the Active state at least for a configurable duration to monitor for DCIs for scheduling data transmission.

2. The apparatus of claim 1,
wherein the processing circuitry is further configured to cause the UE to receive the higher layer configuration signaling via RRC signaling.

3. The apparatus of claim 1,
wherein the processing circuitry is further configured to cause the UE to detect the PDCCH carrying a WUS using a dedicated or configured radio network temporary identifier (RNTI).

4. The apparatus of claim 1,
wherein the processing circuitry is further configured to cause the UE to monitor and detect the PDCCH carrying a WUS in a search space as configured and signaled by the base station.

5. The apparatus of claim 1,
wherein the processing circuitry is further configured to cause the UE to decode the PDCCH carrying a WUS at an aggregation level setting a number of control channel elements (CCEs) in the PDCCH as configured and signaled by the base station.

6. The apparatus of claim 1,
wherein the processing circuitry is further configured to cause the UE to monitor for WUS at one or more monitoring occasions that start at an offset before the Active state duration of the DRX cycle, the offset being configured and signaled by the base station.

7. The apparatus of claim 1,
wherein the processing circuitry is further configured to cause the UE to monitor and detect the PDCCH carrying a WUS in a UE specific search space.

8. The apparatus of claim 1,
wherein the processing circuitry is further configured to cause the UE to:
detect, while in the Active state, the dedicated DCI format transmitted in the PDCCH, wherein detection of the dedicated DCI format indicates entry into a non-Active state in the bandwidth part.

9. The apparatus of claim 1,
wherein the processing circuitry is further configured to cause the UE to:
detect, while in the Active state, the dedicated DCI format transmitted in the PDCCH, wherein detection of the dedicated DCI format indicates a bandwidth part in which to enter upon entering a next Active state.

10. The apparatus of claim 1,
wherein the dedicated DCI format transmitted in the PDCCH includes a field to indicate a number of PDCCH candidates to monitor in a next M DRX cycles.

11. An apparatus comprising:
a memory; and
processing circuitry, wherein the processing circuitry is configured to:
encode a command to be transmitted to a user equipment (UE) that directs the UE to operate in a discontinuous reception (DRX) mode according to an indicated DRX configuration while in a radio resource control (RRC) connected state, wherein a DRX cycle indicated by the DRX configuration includes an Active state during which the UE monitors for downlink control information (DCI) for scheduling data transmission from the base station via a physical downlink control channel (PDCCH) and a non-Active state during which the UE is allowed to not monitor for DCI for scheduling data transmission in order to conserve battery power;
via higher layer configuration signaling, trigger the UE to monitor for a wakeup signal (WUS) during the non-Active state at configurable monitoring occasions, wherein the WUS is sent from the base station via a dedicated DCI format in the PDCCH; and
encode a DCI to be transmitted to the UE while the UE is in the Active state, wherein detection of the DCI triggers the UE to enter into a non-Active state on a bandwidth part; and
wherein the WUS commands the UE to enter the Active state at least for a configurable duration to monitor for DCIs for scheduling data transmission.

12. The apparatus of claim 11,
wherein the processing circuitry is further configured to cause the base station to implement the higher layer configuration signaling via RRC signaling.

13. The apparatus of claim 11,
wherein the processing circuitry is further configured to cause the base station to encode the PDCCH carrying a WUS using a dedicated or configured radio network temporary identifier (RNTI).

14. The apparatus of claim 11,
wherein the processing circuitry is further configured to cause the base station to encode the PDCCH carrying a WUS in a configurable search space that is signaled to the UE.

15. The apparatus of claim 11,
wherein the processing circuitry is further configured to cause the base station to encode the PDCCH carrying a WUS at a configurable aggregation level signaled to the UE that sets a number of control channel elements (CCEs) in the PDCCH.

16. The apparatus of claim 11,
wherein the processing circuitry is further configured to cause the base station to configure and signal to the UE an offset, wherein the UE is to monitor for WUS at monitoring occasions that start at the offset before the Active state duration of the DRX cycle.

17. The apparatus of claim 11,
wherein the processing circuitry is further configured to cause the base station to encode a go-to-sleep (GTS) signal with information commanding the UE to, when waking up after WUS is detected, wake up to be in Active state in a bandwidth part (BWP) indicated by the WUS.

18. A non-transitory computer-readable storage medium comprising instructions to cause processing circuitry of a user equipment (UE), upon execution of the instructions by the processing circuitry, to:
operate, when directed by a base station, in a discontinuous reception (DRX) mode according to an indicated DRX configuration while in a radio resource control (RRC) connected state, wherein a DRX cycle includes an Active state during which the UE monitors for downlink control information (DCI) for scheduling data transmission from the base station via a physical downlink control channel (PDCCH) and a non-Active state during which the UE is allowed to not monitor for DCI for scheduling data transmission in order to conserve battery power; and
after receiving from the base station a higher layer configuration signaling which triggers the UE to monitor for a wake-up signal in the DRX mode, monitor for a wake-up signal (WUS) during the non-Active state at configurable monitoring occasions, wherein the WUS is sent from the base station via the DCI in the PDCCH;
detect the WUS by searching for a dedicated DCI format transmitted in the PDCCH, wherein the WUS includes an indication of a bandwidth part, wherein the indication indicates a first bandwidth is to be monitored in the Active state; and
after detecting the WUS, enter the Active state at least for a configurable duration to monitor for DCIs for scheduling data transmission.

19. The non-transitory computer-readable storage medium of claim 18,
further comprising instructions to cause processing circuitry of the UE, upon execution of the instructions by the processing circuitry, to receive the higher layer configuration signaling via RRC signaling.

20. The non-transitory computer-readable storage medium of claim 18,
further comprising instructions to cause processing circuitry of the UE, upon execution of the instructions by the processing circuitry, to detect the PDCCH carrying a WUS using a dedicated or configured radio network temporary identifier (RNTI).

\* \* \* \* \*